(12) United States Patent
Jain et al.

(10) Patent No.: US 11,392,659 B2
(45) Date of Patent: Jul. 19, 2022

(54) UTILIZING MACHINE LEARNING MODELS TO GENERATE EXPERIENCE DRIVEN SEARCH RESULTS BASED ON DIGITAL CANVAS GESTURE INPUTS

(71) Applicant: Adobe Inc., San Jose, CA (US)

(72) Inventors: Ajay Jain, Ghaziabad (IN); Sanjeev Tagra, Panipat (IN); Sachin Soni, Palam Colony (IN); Ryan Rozich, Austin, TX (US); Jonathan Roeder, Austin, TX (US)

(73) Assignee: Adobe Inc., San Jose, CA (US)

( * ) Notice: Subject to any disclaimer, the term of this patent is extended or adjusted under 35 U.S.C. 154(b) by 468 days.

(21) Appl. No.: 16/288,472

(22) Filed: Feb. 28, 2019

(65) Prior Publication Data

US 2020/0279008 A1    Sep. 3, 2020

(51) Int. Cl.
*G06F 16/9538* (2019.01)
*G06N 20/00* (2019.01)
(Continued)

(52) U.S. Cl.
CPC .......... *G06F 16/9538* (2019.01); *G06F 3/017* (2013.01); *G06F 3/0487* (2013.01);
(Continued)

(58) Field of Classification Search
CPC .............. H04L 63/08; G06F 17/30241; G06F 17/30867; G06F 21/6209; G06F 3/0487;
(Continued)

(56) References Cited

U.S. PATENT DOCUMENTS 7,308,112 B2 * 12/2007 Fujimura ........... G06K 9/00355
382/103
8,213,679 B2 * 7/2012 Yao ........................ G06T 7/246
382/103

(Continued)

OTHER PUBLICATIONS

D. Lopresti and A. Tomkins and J. Zhou, Algorithms for Matching Hand-Drawn Sketches, In Proc. of the Fifth Intl. Workshop on Frontiers in Handwriting Recognition, 1997, 233-238.
(Continued)

*Primary Examiner* — Steven P Sax
(74) *Attorney, Agent, or Firm* — Keller Preece PLLC

(57) ABSTRACT

The present disclosure relates to systems, methods, and non-transitory computer readable media for generating target products for a product search based on gesture input received via a digital canvas. For example, the disclosed systems can utilize digital image classification models to generate product sets based on individual visual product features of digital images of products. The disclosed systems can further receive gesture input within a digital canvas indicating visual product features. In addition, the disclosed systems can compare the gesture input of the digital canvas with representative digital images of product sets generated by particular classification models to identify product sets that include the indicated visual product features. Further, the disclosed systems can provide target products from the identified product sets for display via a product search interface website.

20 Claims, 17 Drawing Sheets

(51) Int. Cl.
*G06F 3/01* (2006.01)
*G06F 16/954* (2019.01)
*G06Q 20/40* (2012.01)
*H04L 9/40* (2022.01)
*G06F 3/0487* (2013.01)

(52) U.S. Cl.
CPC .......... *G06F 16/954* (2019.01); *G06N 20/00* (2019.01); *G06Q 20/40* (2013.01); *H04L 63/08* (2013.01)

(58) Field of Classification Search
CPC .. G06F 3/04812; G06F 3/0482; G06F 3/0484; G06F 16/5854; G06F 17/30259; G06F 3/017; G06F 16/954; G06F 16/9538; G06Q 30/0643; G06Q 20/204; G06Q 20/40; G06Q 30/02; G06Q 30/0601; G06Q 20/12; G06Q 30/00; G06Q 10/0637; G06Q 30/0631; G06Q 10/087; G06N 99/005; G06N 20/00
See application file for complete search history.

(56) References Cited

U.S. PATENT DOCUMENTS

| | | | | |
|---|---|---|---|---|
| 8,478,052 | B1* | 7/2013 | Yee | G06F 16/5846 |
| | | | | 382/224 |
| 8,487,867 | B2* | 7/2013 | Wu | G06F 3/011 |
| | | | | 345/156 |
| 8,594,430 | B2* | 11/2013 | Cristinacce | G06K 9/621 |
| | | | | 382/181 |
| 9,336,456 | B2* | 5/2016 | DeLean | G06K 9/6201 |
| 9,582,482 | B1* | 2/2017 | Sharifi | G06F 9/451 |
| 9,767,620 | B2* | 9/2017 | Li | G06F 3/04817 |
| 10,937,215 | B1* | 3/2021 | Iskandar | G06F 3/011 |
| 10,942,637 | B2* | 3/2021 | Mani | H04N 5/247 |
| 2008/0250012 | A1* | 10/2008 | Hinckley | G06F 16/951 |
| 2009/0003703 | A1* | 1/2009 | Zhang | G06V 30/36 |
| | | | | 382/181 |
| 2010/0030578 | A1* | 2/2010 | Siddique | G06Q 40/12 |
| | | | | 705/3 |
| 2011/0010676 | A1* | 1/2011 | Khosravy | G06Q 30/02 |
| | | | | 715/863 |
| 2011/0213655 | A1* | 9/2011 | Henkin | G06Q 30/00 |
| | | | | 707/E17.061 |
| 2013/0215116 | A1* | 8/2013 | Siddique | G06Q 20/204 |
| | | | | 345/420 |
| 2014/0046935 | A1* | 2/2014 | Bengio | G06F 16/338 |
| | | | | 707/723 |
| 2014/0123079 | A1* | 5/2014 | Wu | G06F 3/017 |
| | | | | 715/863 |
| 2015/0199835 | A1* | 7/2015 | Golding | G06F 3/04815 |
| | | | | 715/202 |
| 2016/0350973 | A1* | 12/2016 | Shapira | G06F 3/016 |
| 2017/0109032 | A1* | 4/2017 | Mélinand | G06F 40/171 |
| 2017/0109578 | A1* | 4/2017 | Bednarowicz | G06V 30/387 |
| 2017/0155631 | A1* | 6/2017 | Du | G06F 16/9535 |
| 2018/0081515 | A1* | 3/2018 | Block | G06F 3/04883 |
| 2018/0095653 | A1* | 4/2018 | Hasek | G06F 3/04883 |
| 2018/0121768 | A1 | 5/2018 | Lin et al. | |
| 2018/0335899 | A1* | 11/2018 | Le Bleis | G06F 16/51 |
| 2019/0034076 | A1* | 1/2019 | Vinayak | G06T 19/20 |
| 2019/0065907 | A1* | 2/2019 | Strong | G06K 9/6262 |
| 2019/0146458 | A1* | 5/2019 | Roh | G16H 50/20 |
| | | | | 700/98 |
| 2019/0220694 | A1* | 7/2019 | Biswas | G06K 9/6202 |
| 2019/0236677 | A1* | 8/2019 | Anusha | G06Q 30/0631 |
| 2020/0142978 | A1* | 5/2020 | Salokhe | G06F 16/5854 |
| 2020/0143154 | A1* | 5/2020 | Ette | G06T 7/60 |
| 2020/0167556 | A1* | 5/2020 | Kaur | G06F 3/0304 |
| 2020/0195463 | A1* | 6/2020 | Johnson | G06V 40/176 |
| 2020/0250890 | A1* | 8/2020 | Zhou | G06F 3/0346 |
| 2020/0320748 | A1* | 10/2020 | Levinshtein | G06T 7/12 |

OTHER PUBLICATIONS

Brendan Klare and Anil K. Jain, Sketch to Photo Matching : A Feature-based Approach, in Proc.SPIE Conference on Biometric Technology for Human Identification, VII, 2010.

Zhu, B., Quigley, E., Sketch-based Object Recognition, CS 231A Project Report, 2015.

* cited by examiner

UTILIZING MACHINE LEARNING MODELS TO GENERATE EXPERIENCE DRIVEN SEARCH RESULTS BASED ON DIGITAL CANVAS GESTURE INPUTS

BACKGROUND

Advancements in software and hardware platforms have led to a variety of improvements in systems that generate product-related search results. For example, product search systems are now able to search through large databases containing terabytes of information to identify products that correspond to a search query provided by a user. Amid efforts to improve these product search systems, some systems can, for example, prioritize search results to display relevant products based on various factors such as relevance to the search query, popularity amongst users, or ratings.

Despite these advances however, conventional product search systems continue to suffer from a number of disadvantages, particularly in their accuracy, efficiency, and flexibility. Indeed, conventional product search systems often generate inaccurate search results because these systems rely on input that is not flexible or detailed enough to capture user intent in searching for a product. For example, many conventional product search systems rely on text-based searches and filtering techniques to generate search results. However, text-based searches are often prohibitive because users cannot accurately describe a desired product in a search bar to generate desired results. Even with the present advancements in text parsing technology, text input can be limited in its ability to represent intent when performing a search for a product. In addition, the filtering techniques utilized by many product search systems are broad category-based segregators that provide little granularity or specificity to a search. Thus, conventional product search systems often are, by virtue of their reliance on text input and filters, limited to generating search results that inaccurately reflect the intent of a search.

Additionally, many conventional product search systems are inefficient. In particular, conventional product search systems require excessive numbers of user actions and time to perform a search for a product. For example, conventional product search systems often require users to perform multiple clicks, provide multiple keystrokes (or other text input), traverse through nested menus, and apply multiple filters within a single search. As a result of the onerous interaction required by conventional product search systems, these systems further require excessive processing time and processing power to process each of the clicks, keystrokes, menu interactions, and other input from a user. Additionally, these conventional systems are time-consuming and slow to surface relevant products from a search due to the excessive user action required.

Moreover, many conventional product search systems are also inflexible. For example, many product search systems are limited to rigid types of search input. Indeed, many of these conventional product search systems require a user to enter a search query in text form (or click a categorical box) to then populate search results. Thus, these systems rigidly apply text-based or filtering search techniques to surface product results from a search query. However, these systems cannot flexibly adapt to generate and modify search results (on-the-fly) based on different and/or multiple input types.

Due at least in part to the inaccuracy, inefficiency, and inflexibility of conventional product search systems, these systems often cause users to redirect to external interfaces (e.g., websites or applications). Indeed, the above-described disadvantages cause conventional product search systems to fail to retain users and cause users to navigate away from search websites in conducting digital searches.

Thus, there are several disadvantages with regard to conventional product search systems.

SUMMARY

One or more embodiments described herein provide benefits and solve one or more of the foregoing or other problems in the art with systems, methods, and non-transitory computer readable media that utilize machine learning models to generate experience-driven search results based on digital canvas gesture inputs. Indeed, in one or more embodiments the disclosed systems provide experience-driven search capabilities by providing, within a website, an interactive digital canvas (and corresponding editing tools) to receive gesture input for product searches. In addition, the disclosed systems can determine visual product features indicated by gesture input and search a product repository for products that correspond to (e.g., match or include) the visual product features. For example, in some embodiments the disclosed systems can perform a digital search by utilizing an input-classifier matching model to identify a product set generated via a particular digital image classification model that corresponds to identified visual product feature(s) of the gesture input from the digital canvas. Moreover, the disclosed systems can display one or more digital images corresponding to the identified product set based on the gesture input. In this manner, disclosed systems can more efficiently, accurately, and flexibly generate digital product search results, thus increasing engagement, retention, and conversion via digital website search relative to conventional systems.

Additional features and advantages of the present application will be set forth in the description which follows, and in part will be obvious from the description, or may be learned by the practice of such example embodiments.

BRIEF DESCRIPTION OF THE DRAWINGS

This disclosure will describe one or more embodiments of the invention with additional specificity and detail by referencing the accompanying figures. The following paragraphs briefly describe those figures, in which.

DETAILED DESCRIPTION

Figure 1:
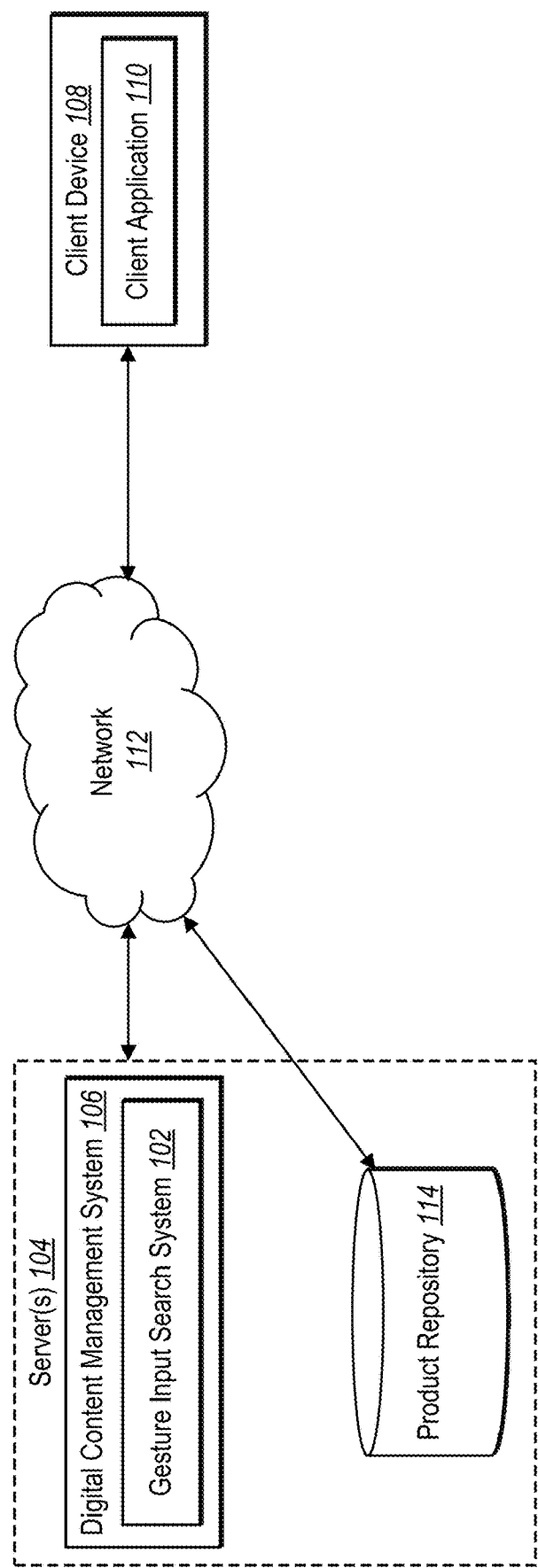
FIG. 1 illustrates an example environment for implementing a gesture input search system in accordance with one or more embodiments.

One or more embodiments described herein provide benefits and solve one or more of the foregoing or other problems in the art with a gesture input search system that can generate target products for a product search based on visual product features indicated via gesture input received by way of a digital canvas. To generate product search results including one or more target products, the gesture input search system can utilize digital image classification models to generate product sets of digital images depicting various products including visual product features. In particular, in one or more embodiments, the gesture input search system provides a digital canvas for display via a website. The gesture input search system can identify a gesture input via the digital canvas, where the gesture input indicates one or more visual product features of a target product for a search. Based on the gesture input, the gesture input search system can utilize an input-classifier matching model to identify product sets corresponding to classification models specifically tuned to the visual product feature(s) of the gesture input. Specifically, in one or more embodiments, the gesture input search system analyzes the gesture input and representative digital images of various product sets generated via various digital image classification models to determine a product set that include the visual product feature(s) of the gesture input. The gesture input search system can then provide one or more digital images from the product set that includes the visual product feature(s) for display via the website. By utilizing a digital canvas that identifies gesture input together with a plurality of digital image classification models and an input-classifier matching model, the gesture input search system can efficiently and flexibly identify target products that accurately reflect digital search intent.

To elaborate, the gesture input search system can utilize a plurality of digital image classification models to generate product sets for identifying target products for a product search. In particular, the gesture input search system can utilize a given digital image classification model to classify or generate a product set (e.g., an index) of products that reflect a particular visual product feature. To classify products into a product set, the gesture input search system can utilize a digital image classification model to analyze digital images depicting various products and identify the products within the digital images. Moreover, the given digital image classification system can generate a product set by identifying products that include specific visual product features. Thus, by utilizing a digital image classification model for each visual product feature, the gesture input search system can generate a plurality of product sets that portray particular visual product features. The gesture input search system can further scale the number and size of the product sets as products within a product repository are updated or modified.

In addition to using digital image classification models, the gesture input search system can train the digital image classification models to classify digital images into product sets based on visual product features. Particularly, the gesture input search system can train the digital image classification models based on training data such as ground truth product sets and training digital images depicting various visual product features. For instance, the gesture input search system can train a given digital image classification model to classify digital images of shirts containing a circular logo into a product set. As another example, the gesture input search system can train another digital image classification model to classify digital images of shirts containing centrally located logos into another product set.

To train the digital image classification models, the gesture input search system can generate training data. In particular, the gesture input search system can generate training digital images to train the plurality of digital image classification models to classify digital images into product sets. For example, the gesture input search system can generate training digital images by generating a training set of plain or generic digital images that depict a product (e.g., with no visual product features). The gesture input search system can further add one or more visual product features to the plain digital images to generate training digital images for training the digital image classification models to classify digital images based on the visual product features.

As mentioned, the gesture input search system can receive and identify gesture input via a digital canvas. Indeed, the gesture input search system can provide a digital canvas (along with various editing tools) as part of a product search interface within a website or application. Thus, the gesture input search system can identify gesture input that indicates one or more visual product features as a basis for a product search. Based on determining a visual product feature from the gesture input, the gesture input search system can search for digital images from the various products sets classified by the digital image classification models. Indeed, the gesture input search system can determine a product set that corresponds to an identified visual product feature.

To determine a product set that corresponds to a digital image classification model trained to identify a visual product feature, the gesture input search system can utilize an input-classifier matching model. In particular, the gesture input search system can utilize an input-classifier matching model to match the gesture input received via the digital canvas with a product set generated by a particular classifier that includes digital images depicting the visual product feature of the gesture input. For example, the gesture input search system can utilize the input-classifier matching model to analyze representative digital images associated with the product sets (or associated with the digital image classification models that generate the product sets) to identify representative digital images that include or depict the visual product feature of the gesture input. Indeed, the gesture input search system can assign representative digital image to product sets (and/or to corresponding digital image classification models) by generating or selecting digital images that depict products and/or visual product features.

Based on determining one or more product sets that correspond to a gesture input, the gesture input search system can further identify one or more target products from the product sets. For example, the gesture input search system can provide target products that include the visual product feature and that are the same product type as the product search. In some embodiments, the gesture input search system can provide the target products as search results within a search element of a product search interface of a website or application. The gesture input search system can further update the product search results including the identified target products including the visual product feature based on modifications to the gesture input via the digital canvas (e.g., to modify the visual product feature or indicate a new visual product feature).

The gesture input search system provides several advantages over conventional systems. For example, the gesture input search system improves accuracy over conventional product search systems. More specifically, the gesture input search system provides a digital canvas for receiving more granular, detailed input from a user to generate search results that more accurately reflect a search intent. In addition, by utilizing digital image classification models that are specific to particular product sets of various visual product features in conjunction with an input-classifier matching model, the gesture input search system can identify product sets that reflect particular visual product features drawn as gesture input via a digital canvas. Thus, the gesture input search system more accurately identifies and provides products that include specific visual product features.

In addition, the gesture input search system improves efficiency over conventional systems. Particularly, the gesture input search system provides, within a product search interface, a digital canvas that enables a user to quickly and precisely indicate desired searches (i.e., without the need to perform a variety of different user inputs or interactions). Indeed, the gesture input search system reduces the number of user actions required to perform a product search by eliminating (or reducing) the need for clicking repeatedly, traversing through nested menus, and applying multiple filters within a single search. As a result of reducing the number of user actions, the gesture input search system further improves the speed of surfacing relevant search results. Further, the gesture input search system can reduce the time and computer power needed in processing and searching based on duplicative and repetitive user actions.

As a further advantage, the gesture input search system improves flexibility over conventional product search systems. Particularly, the gesture input search system is highly configurable in providing a digital canvas for receiving a variety of gesture input and generating different product sets based on individual visual product features. Indeed, the gesture input search system can receive gesture input (e.g., drawings) for a variety of different visual product features (e.g., logos or accessories in particular locations or arrangements) and identify target products that include the visual product features. In addition, the gesture input search system is adaptive to generate search results based on multiple input types at a time. For example, the gesture input search system can receive text-based search input together with gesture input to perform a product search and can generate search results based on the combination of the inputs. Further, the gesture input search system can adaptively update product sets by adding new sets and modifying existing sets when new products are added to the product repository.

Due at least in part to the improved accuracy, efficiency, and flexibility, the gesture input search system can further provide improved user engagement. In particular, the gesture input search system provides a product search interface (e.g., as part of a website or application) that includes a digital canvas, editing tools, and purchasing elements to more effectively retain users within a single interface. Thus, the gesture input search system prevents users from leaving to external interfaces or web sites to carry out digital product searches.

As illustrated by the foregoing discussion, the present disclosure utilizes a variety of terms to describe features and benefits of the gesture input search system. Additional detail is hereafter provided regarding the meaning of these terms as used in this disclosure. In particular, the term "product search interface" (or simply "user interface") refers to an interactive digital user interface for identifying a target product. For example, a product search interface can include a user interface that comprises search results such as digital images of products in addition to digital elements for performing a product search and/or carrying out a product purchase. As mentioned, a product search interface can include digital elements such as a text input element (e.g., a search bar) and digital canvas for performing a product search.

Relatedly, the term "digital canvas" refers to an interactive digital element for receiving gesture input. In particular, a digital canvas can include a digital element within a user interface that encompasses an area within the user interface dedicated to receiving user input in the form of gestures (e.g., drawing input) to indicate products and/or visual product features as part of a search query. In some embodiments, a digital canvas is rectangular in shape, while in other embodiments a digital canvas is circular or some other shape. In addition (or alternatively), a digital canvas can include (or be in the shape of) a template of a particular product. For example, a digital canvas can include an outline of a shirt, a ball, a purse, a backpack, a pair of glasses, a pair of pants, a pen, a water bottle, or any other product. Relatedly, the term "product" refers to an item purchase-able via a website or application. A product can include a "product type" that refers to an object class or label associated with the product. Such product types can include labels such as "shirt," "ball," "purse," or other descriptors of objects portrayed in digital images of given products.

As mentioned, the gesture input search system receives gesture input via a digital canvas. As used herein, the term "gesture input" refers to a drawing input (e.g., drawing input received via a digital canvas). A gesture input can refer to a sketch, illustration, insertion of an object, or other drawing input to indicate a product and/or a visual product feature of a product. For example, gesture inputs can include touch gestures that reflect a drawing of an object that a user seeks in a target product. Indeed, by receiving gesture input, the gesture input search system can identify one or more visual product features of a product.

As used herein, the term "visual product feature" refers to a visible characteristic of a product. In particular, a visual product feature includes a characteristic or component of a product indicated by gesture input that is visible to a user. For example, a visual product feature can include an object associated with (e.g., on or within) a product, a location of an object on (or in relation to) a product, a shape of an object within a product, a size of an object within a product, a rotation or orientation of an object within a product, or some other visible attribute of a product configurable via gesture input. Such objects associated with visual product features can include logos, zippers, laces, designs, seams, laces, holes, collars, lenses, straps, jewels, buckles, buttons, cases, caps, or other visual features associated with products.

As mentioned, the gesture input search system utilizes gesture input to search for one or more target products in a product search. As used herein, the term "target product" refers to a product that is the target or aim of a product search. In particular, a target product refers to a product that reflects a search intent in performing a product search. In some embodiments, a target product refers to a product that a user desires to view or purchase. Thus, the gesture input search system generates search results in the form of one or more target products identified from a product set that corresponds to a visual product feature of received gesture input. Relatedly, the term "product set" refers to a set or group of products. A product set can include one or more digital images depicting products of a particular product type and/or including a particular visual product feature. Indeed, a product set can include digital images that each portray a common visual product feature. Additionally, a product set can include digital images that each portray products of a particular product type.

To identify target products from one or more product sets, the gesture input search system utilizes an input-classifier matching model. As used herein, the term "input-classifier matching model" refers to a machine learning model trained to match a visual product feature with a digital image classification model (e.g., match a feature with a product set generated by a particular digital image classification model). In particular, an input-classifier matching model can include a neural network trained to match visual product feature indicated by gesture input to visual product features of product sets generated by a plurality of digital image classification models. For example, an input-classifier matching model can identify product sets corresponding to a visual product feature by analyzing representative digital images associated with various product sets to determine those representative digital images that depict the visual product feature. The term "representative digital image" refers to a digital image that represents a product set or a corresponding digital image classification model. In particular, a representative digital image refers to a digital image that illustrates a product and a visual product feature included within each of the digital images of a given product set.

To generate product sets, the gesture input search system can utilize digital image classification models. As used herein, the term "digital image classification model" refers to a machine learning model for organizing or classifying digital images of products into categories or product sets. In some embodiments, a digital image classification model refers to a neural network configured to generate a class of digital images depicting a particular product and/or visual product feature based on object recognition and/or label identification. Indeed, a digital image classification model can classify digital images that each include a particular visual product feature into a given product set and can classify digital images including a different visual product feature into a different product set.

In addition, the term neural network (such as the input-classifier matching model or a digital image classification model) refers to a computer-based algorithm that can be tuned (e.g., trained) based on inputs to approximate unknown functions. For example, a neural network includes a machine learning model that utilizes interconnected artificial neurons (or layers) that communicate and learn to approximate complex functions and generate outputs based on a plurality of inputs provided to the model. In some embodiments, a neural network can employ supervised learning, while in other embodiments a neural network can employ unsupervised learning or reinforced learning. In the same or other embodiments, a neural network can be a convolutional neural network, a recurrent neural network, a fully connected convolutional neural network and/or a deep neural network.

Relatedly, the term "train" refers to utilizing information to tune or teach a neural network. The term "training" (used as an adjective or descriptor, such as "training data" or "training digital image") refers to information or data utilized to tune or teach the model. In some embodiments, the gesture input search system trains one or more models (e.g., neural networks) to generate accurate predictions based on training data. In addition, the gesture input search system can generate training data in the form of training digital images. For example, the gesture input search system can generate a training digital image from a plain or generic digital image of a product by adding a visual product feature to the plain digital image to generate a training digital image.

Additional detail regarding the gesture input search system will now be provided with reference to the figures. For example, FIG. 1 illustrates a schematic diagram of an example environment for implementing a gesture input search system 102 in accordance with one or more embodiments. An overview of the gesture input search system 102 is described in relation to FIG. 1. Thereafter, a more detailed description of the components and processes of the gesture input search system 102 is provided in relation to the subsequent figures.

As shown in FIG. 1, the environment includes server(s) 104, a client device 108, and a network 112. Each of the components of the environment can communicate via the network 112, and the network 112 may be any suitable network over which computing devices can communicate. Example networks are discussed in more detail below in relation to FIG. 15.

As mentioned, the environment includes a client device 108. The client device 108 can be one of a variety of computing devices, including a smartphone, tablet, smart television, desktop computer, laptop computer, virtual reality device, augmented reality device, or other computing device as described in relation to FIG. 15. Although FIG. 1 illustrates a single client device 108, in some embodiments the environment can include multiple different client devices, each associated with a different user. For example, the client device 108 can receive user input in the form of gesture input and/or text input and provide the information pertaining to user input to the server(s) 104. Thus, the gesture input search system 102 on the server(s) 104 can receive information for user input to use in generating target products for a product search.

As shown, the client device 108 includes a client application 110. In particular, the client application 110 may be a web application, a native application installed on the client device 108 (e.g., a mobile application, a desktop application, etc.), or a cloud-based application where all or part of the functionality is performed by the server(s) 104. The client application 110 can present or display information to a user, including a product search interface for performing product searches and purchasing desired products. A user can interact with the client application 110 to provide user input to, for example, create or modify a gesture input via a digital canvas.

As illustrated in FIG. 1, the environment includes the server(s) 104. The server(s) 104 may generate, store, process, receive, and transmit electronic data, such as visual product features and digital images of products. For example, the server(s) 104 may receive data from the client device 108 in the form of a gesture input. In addition, the server(s) 104 can analyze the gesture input to determine an indicated visual product feature and can identify target products that include the visual product feature. The server(s) 104 can transmit data to the client device 108 to provide the target products for display via the client application 110. The server(s) 104 can communicate with the client device 108 to transmit and/or receive data via the network 112. In some embodiments, the server(s) 104 comprises a content server. The server(s) 104 can also comprise an application server, a communication server, a web-hosting server, a social networking server, a digital content campaign server, or a digital content management server.

As shown in FIG. 1, the server(s) 104 can also include the gesture input search system 102 as part of a digital content management system 106. The digital content management system 106 can communicate with the client device 108 to generate, modify, and transmit digital content, such as a website including one or more digital images of products or other webpage design elements such as a digital canvas and various editing tools. In some embodiments, the server(s) 104 further include a product repository 114. In particular, the server(s) 104 access and store information within the product repository such as digital images categorized into various product sets according to product type and/or depicted visual product features. In other embodiments, the product repository 114 is located externally from the server(s) 104 and is maintained by a third-party server connected via the network 112.

Although FIG. 1 depicts the gesture input search system 102 located on the server(s) 104, in some embodiments, the gesture input search system 102 may be implemented by (e.g., located entirely or in part) on one or more other components of the environment. For example, the gesture input search system 102 may be implemented by the client device 108 and/or a third-party device.

In some embodiments, though not illustrated in FIG. 1, the environment may have a different arrangement of components and/or may have a different number or set of components altogether. For example, the client device 108 may communicate directly with the gesture input search system 102, bypassing the network 112. Additionally, the gesture input search system 102 can include one or more additional databases (e.g., a training database storing training data) housed on the server(s) 104 or elsewhere in the environment.

Figure 2:
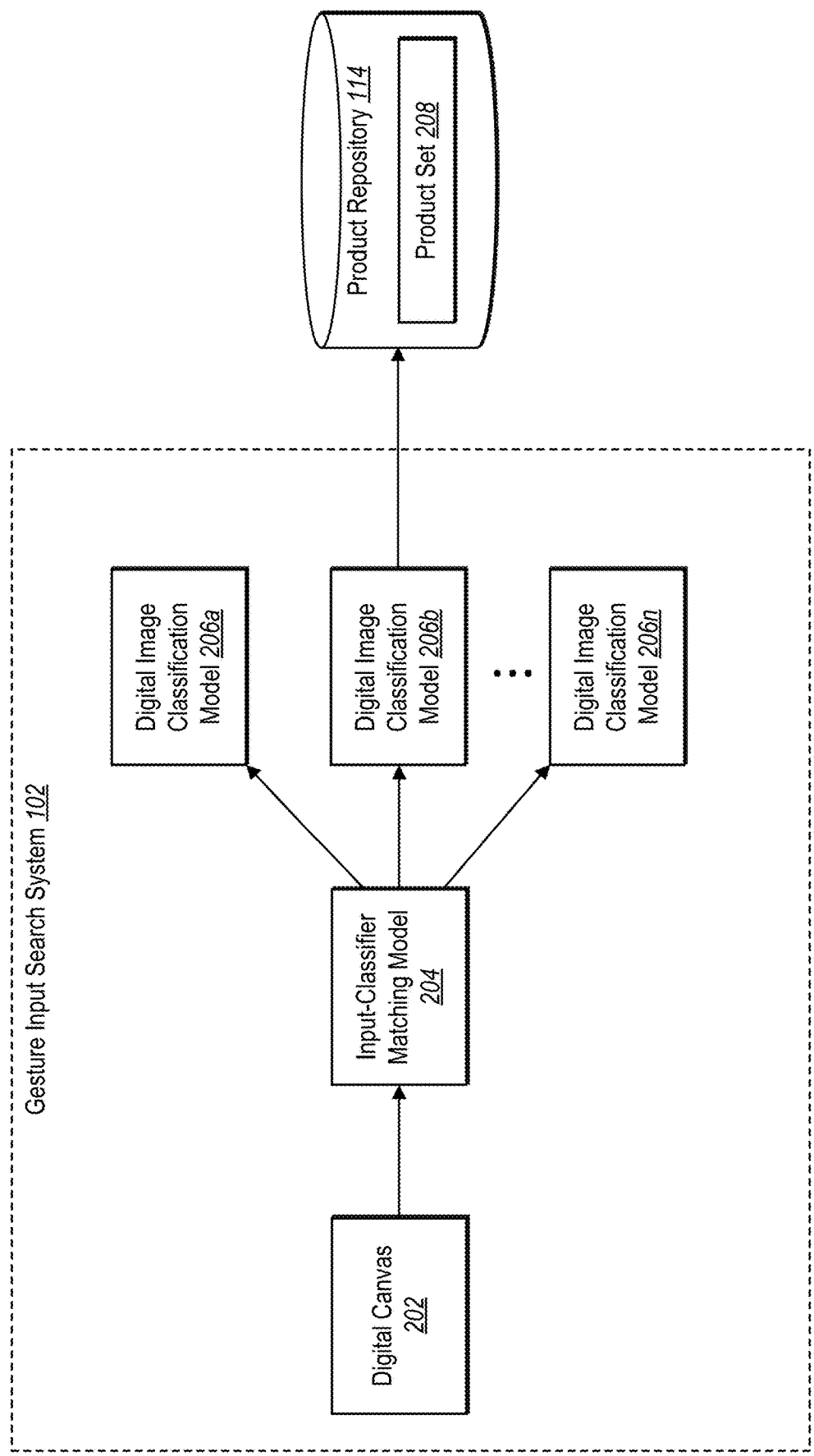
FIG. 2 illustrates an example architecture of the gesture input search system in accordance with one or more embodiments.

As mentioned, the gesture input search system 102 utilizes gesture input received via a digital canvas to generate product search results in the form of target products. FIG. 2 illustrates an example schematic diagram of the gesture input search system 102 in accordance with one or more embodiments. As shown in FIG. 2, the gesture input search system 102 can include a digital canvas 202, an input-classifier matching model 204, and a plurality of digital image classification models 206a-206n. In some embodiments, the gesture input search system 102 further includes the product repository 114.

To generate target products for a product search, the gesture input search system 102 utilizes the digital canvas 202 to receive gesture input from a user. In particular, the gesture input search system 102 receives, via the digital canvas 202, a gesture input such as one or more swipes and/or click-and-drags that indicate a visual product feature to use as a basis for a product search. For example, the gesture input search system 102 receives a gesture input depicting a particular object such as a logo, series of buttons, zipper, or a design that the user desires to search for on a product. The gesture input search system 102 can further determine visual product features indicating a size, location, rotation, and/or shape of the object drawn by the gesture input relative to the target product.

In some embodiments, the gesture input search system 102 provides the digital canvas 202 to a user as part of a product search interface within a web site or other application (e.g., the client application 110). In some embodiments, the gesture input search system 102 provides the digital canvas 202 as a blank space within a product search interface that a user can interact with to draw various visual product features for a search. In other embodiments, the gesture input search system 102 provides the digital canvas 202 including a template depicting an outline or representation of a product or product type that the user can modify with gesture input to add, remove, or modify visual product features. For example, the gesture input search system 102 can receive a user input to modify the digital canvas 202 to add or remove a template of a particular product type.

Additionally, the gesture input search system 102 further provides other digital elements within the product search interface together with the digital canvas 202. For instance, the gesture input search system 102 provides editing tools whereby a user can edit or modify gesture input indicating a visual product feature. Additionally, the gesture input search system 102 provides a text input element such as a search bar whereby a user can enter a text-based search query. Indeed, in some embodiments, the gesture input search system 102 utilizes a combination of text input and gesture input to generate target products for a search result—e.g., by identifying a product type based on the text input and visual product features based on the gesture input.

As further illustrated in FIG. 2, the gesture input search system 102 utilizes an input-classifier matching model 204 to analyze gesture input received via the digital canvas 202. In particular, the gesture input search system 102 utilizes the input-classifier matching model 204 to determine one or more visual product features drawn by the user using gesture input. In some embodiments, the gesture input search system 102 further utilizes the input-classifier matching model 204 to identify a product (e.g., a product type) corresponding to the digital canvas 202 (e.g., as illustrated by the gesture input or as indicated by a product type of a template-based digital canvas).

The gesture input search system 102 further utilizes the input-classifier matching model 204 to identify one or more product sets that correspond to the gesture input. In particular, the gesture input search system 102 utilizes the input-classifier matching model 204 to identify product sets that include digital images that depict the visual product feature(s) of the gesture input. As shown in FIG. 2, for example, the gesture input search system 102 analyzes product sets associated with the digital image classification models 206a-206n to identify the product set 208 that corresponds to the gesture input received via the digital canvas 202.

To identify the product set 208, the gesture input search system 102 utilizes the input-classifier matching model 204 to analyze representative digital images associated with the various product sets associated with the digital image classification models 206a-206n. The input-classifier matching model 204 determines which representative digital images correspond to (e.g., match) the gesture input by identifying those representative digital images that depict the visual product feature(s) of the gesture input. Thus, as shown in FIG. 2, the gesture input search system 102 determines, via the input-classifier matching model 204, that the product set 208 includes the visual product feature(s) indicated within the digital canvas 202. While FIG. 2 illustrates a single product set 208 corresponding to the gesture input, in some embodiments the input-classifier matching model 204 identifies more than one product set that corresponds to the gesture input, each product set corresponding to a respective digital image classification model of the digital image classification models 206a-206n.

To generate the product sets for matching to the visual product feature, the gesture input search system 102 further utilizes the digital image classification models 206a-206n. In particular, the gesture input search system 102 utilizes the digital image classification models 206a-206n to generate respective product sets—a separate product set for each of the digital image classification models 206a-206n corresponding to individual visual product features. To illustrate, the gesture input search system 102 utilizes the digital image classification model 206a to generate a corresponding product set by analyzing digital images from the product repository 114 (e.g., a MAGENTO database) to identify those digital images that include a particular product (e.g., product type) and/or that depict products including a particular visual product feature.

To classify digital images into a product set, the gesture input search system 102 applies, via the digital image classification models 206a-206n, a particular digital image analysis technique. To elaborate, in relation to FIG. 2 the gesture input search system 102 implements a You Only Look Once or "YOLO" network to perform real-time object detection within digital images. For example, the gesture input search system 102 detects positions of products within digital images and determines boundaries for the products to eliminate extra items or objects present in the digital images. In some embodiments, the gesture input search system 102 generates product boundaries that are rectangular and that approximate the bounds of a product within a digital image. In other embodiments, the gesture input search system 102 generates exact product boundaries that outline the precise pixels covered by the product and that exclude those pixels not covered by the product within a particular digital image.

To classify digital images into product sets, in relation to FIG. 2 the gesture input search system 102 utilizes a separate digital image classification model to classify digital images for each visual product feature. Thus, as new digital images are added to the product repository 114 (e.g., as new products are released) and/or as visual product features are added to products, the gesture input search system 102 updates the product sets by utilizing digital image classification models 206a-206n to modify existing product sets as well as by adding new digital image classification models for generating new product sets.

Additionally, the gesture input search system 102 generates product sets via the digital image classification models 206a-206n by passing the regions within the boundaries of the products (e.g., as identified via the YOLO network) through the digital image classification models 206a-206n. The classification models 206a-206n return indications of whether or not the given digital images belong to the respective product sets, and further provide corresponding confidence scores for the determinations. For example, the gesture input search system 102 utilizes the digital image classification model 206b shown in FIG. 2 to classify the product set 208 by analyzing digital images and, for each digital image, determining that the digital image does or does not belong to the product set 208 (e.g., by determining that the digital image does or does not include a particular visual product feature) and further providing a confidence score (e.g., a score from 0 to 1) for the determination.

In some embodiments, the gesture input search system 102 classifies a digital image into a product set when the determination that the digital image belongs to the product set is accompanied by a confidence score of greater than 0.95 or 95%. For instance, in classifying digital images of shirts, the gesture input search system 102 can generate product types or product classes for visual product features such as "Logo on Sleeve" for digital images of shirts that depict a logo on a sleeve, "Logo at Center" for digital images of shirts that depict logos in the center, "Logo at Bottom Left" for digital images of shirts that depict logos on the bottom left, and "No Logo" for digital images of shirts that depict no logo.

As mentioned, the gesture input search system 102 provides the digital canvas 202 to a user by way of a product search interface. Indeed, FIG. 3 illustrates a sequence flow diagram including a sequence of acts performed by various components of the gesture input search system 102 (e.g., the product search interface 302, the digital canvas 202, the input-classifier matching model 204, and the product repository 114) in accordance with one or more embodiments.

Figure 3:
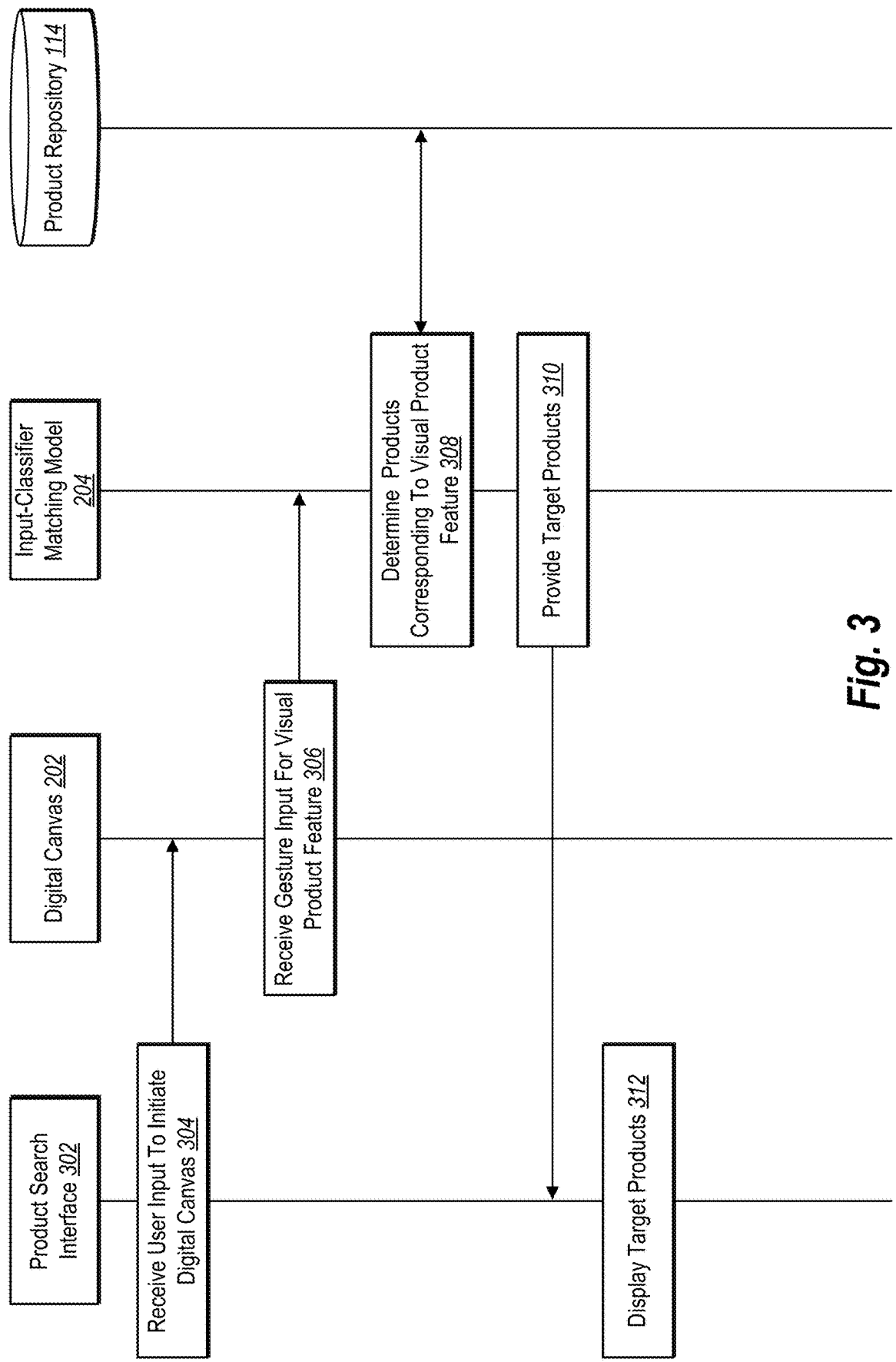
FIG. 3 illustrates an example sequence flow of the gesture input search system in accordance with one or more embodiments.

As illustrated in FIG. 3, the product search interface 302 performs an act 304 to receive user input to initiate the digital canvas 202. In particular, the product search interface 302 receives user input such as a click or tap to open or enable presentation of the digital canvas 202 within the product search interface 302. In some embodiments, the digital canvas 202 is presented by default within the product search interface 302 without requiring user input to initiate the digital canvas 202.

Upon initiating the digital canvas 202, the digital canvas 202 performs an act 306 to receive one or more gesture inputs for one or more visual product features. In particular, the digital canvas 202 receives gestures inputs of a user drawing a particular object at a particular location in relation to a product. As mentioned, the digital canvas 202 can include a template of a product as an outline or some other representation of the product that the user can modify by way of gesture input.

As shown, the input-classifier matching model 204 receives the gesture input from the digital canvas 202 and performs an act 308 to determine products corresponding to one or more visual product features indicated by the gesture input. Indeed, the input-classifier matching model 204 analyzes the gesture input to identify one or more visual product features. In some embodiments, the input-classifier matching model 204 determines the visual product features from the gesture input by analyzing (e.g., utilizing a sketch recognition technique such as Sketch2Tag) the digital canvas 202 to recognize objects such as products and corresponding visual product features drawn by gesture input within the digital canvas. In some embodiments, the input-classifier matching model 204 determines a visual product feature based on a selection of a particular editing tool that indicates a type of visual product feature for gesture input. For example, a user can select a zipper tool to draw a zipper on a product such as a backpack, or a user can select a sleeve tool to edit sleeves of a shirt.

In addition, the input-classifier matching model 204 matches the visual product feature(s) to one or more product sets within the product repository 114. In particular, the input-classifier matching model 204 analyzes representative digital images of product sets within the product repository to identify one or more product sets with representative digital images that include the visual product feature of the gesture input. In some embodiments, the gesture input search system 102 predetermines and assigns the representative digital images to the product sets (or to the corresponding digital image classification models). For example, in these embodiments the gesture input search system 102 utilizes digital image classification models to classify the product sets within the product repository 114 and to determine a representative digital image from each product set that indicates the product and/or visual product feature depicted by the digital images within the product set.

In these or other embodiments, the gesture input search system 102 assigns representative digital images based on confidence scores of the digital images within the respective product sets. As described above, the gesture input search system 102 utilizes digital image classification models 206a-206n to generate confidence scores for digital images as part of generating product sets. Thus, the digital images within a given product set have individual confidence scores indicating respective probabilities of belonging to the product set. Based on these confidence scores, the gesture input search system 102 (e.g., utilizing one of the digital image classification models 206a-206n) can select a digital image having a highest confidence score within a product set to assign as the representative digital image for the product set.

In addition to (or as part of) the act 308, the input-classifier matching model 204 determines confidence scores (e.g., similarity scores) for the product sets within the product repository 114. In particular, the input-classifier matching model 204 analyzes each of the product sets to compare the representative digital images of the product sets with the digital canvas including the visual product feature(s) of the gesture input. To generate a confidence score (or a similarity score) by comparing a representative digital image with the digital canvas, the input-classifier matching model 204 utilizes a digital image comparison technique to generate a difference (e.g., a distance or delta) between an image shown on the digital canvas and the representative digital image. In some embodiments, the input-classifier matching model 204 utilizes an image comparison technique based on locally sensitive hashing or based on a determination of a structural similarity index measure (SSIM). For example, the input-classifier matching model 204 utilizes a machine learning model to extract features such as Gabor filters, local binary patterns, or a histogram of oriented gradients (HOG). In these or other embodiments, the input-classifier matching model 204 accesses an image similarity application programming interface (API) to utilize an image comparison model to generate confidence scores.

By comparing the digital canvas (or the visual product feature(s)) with the representative digital images, the input-classifier matching model 204 determines confidence scores for each of the product sets (or for the corresponding digital image classification models) that indicate probabilities that the product sets correspond to the gesture input. Indeed, a confidence score indicates a similarity of a given product set with what appears on the digital canvas (e.g., the visual product feature(s) of the gesture input). In some embodiments, the input-classifier matching model 204 determines confidence scores in a range from 0 to 1, where 1 indicates the highest probability (e.g., 100%) of a product set corresponding to or matching a gesture input.

Based on the confidence scores of the product sets, the input-classifier matching model 204 further ranks the product sets. In some embodiments, the input-classifier matching model 204 ranks the product sets in order of confidence scores, highest to lowest (or lowest to highest). In these or other embodiments, the input-classifier matching model 204 selects or identifies one or more product sets with confidence scores that satisfy a threshold. For example, the input-classifier matching model 204 selects those product sets with a confidence score that is 0.95 or higher. In other embodiments, the input-classifier matching model 204 selects a single product set as corresponding to the gesture input. For example, the input-classifier matching model 204 identifies a product set with a highest confidence score among the product sets. In still other embodiments, the input-classifier matching model 204 selects a top number (e.g., 2 or 5 or 10) of product sets with the highest confidence scores from among the product sets within the product repository 114.

In these or other embodiments, the input-classifier matching model 204 determines a product set that corresponds to received gesture input based on product types associated with the product sets. To elaborate, the input-classifier matching model 204 analyzes the digital canvas 202 to determine a product type associated with the digital canvas and further analyzes the representative digital images of the product sets to identify product sets with matching product types. In some embodiments, upon determining a product type of the digital canvas 202, the input-classifier matching model 204 compares the product type with already-determined product types of the product sets (e.g., where the product types are determined upon indexing or classifying the product sets using the digital image classification models). For example, where the gesture input search system 102 provides a digital canvas that displays a shirt, the input-classifier matching model 204 can identify product sets that include shirts (e.g., limit to only product sets that portray shirts).

In some embodiments the digital canvas 202 includes a template of a product having a predetermined product type. In other embodiments, the digital canvas 202 receives user input to draw or write a product, and the input-classifier matching model 204 analyzes the digital canvas 202 to determine a product type associated with the digital canvas. Thus, the input-classifier matching model 204 compares the product type of the digital canvas to product types of representative digital images of product sets (or of the product sets themselves). Additionally, the input-classifier matching model 204 compares the representative digital images of product sets that have matching product types (e.g., product types with similarity scores above a similarity score threshold) with the gesture input to determine one or more product sets that correspond to the gesture input (e.g., that include the visual product features) by determining confidence scores, as described above.

As further illustrated in FIG. 3, the input-classifier matching model 204 performs an act 310 to provide target products to the product search interface 302 for display. To provide the target products, the input-classifier matching model 204 first identifies or determines the target products. Particularly, the input-classifier matching model 204 determines target products from the one or more product sets identified as corresponding to the gesture input. In some embodiments, the input-classifier matching model 204 determines target products as all of the products within the corresponding product sets. In other embodiments, the input-classifier matching model 204 determines target products as a subset of products within the corresponding product sets. For example, the input-classifier matching model 204 identifies a number of most relevant products from the product by analyzing the products and comparing digital images of the products with the digital canvas 202 to determine similarity scores. The input-classifier matching model 204 selects those products with similarity scores above a threshold as target products.

Based on determining the target products, the input-classifier matching model 204 further performs the act 310 to provide the target products to the product search interface 302. In addition, and as further shown in FIG. 3, the product search interface 302 performs an act 312 to display the target products. For instance, the product search interface 302 displays the target products as search results within the product search interface as part of a website or application interface display. Indeed, the product search interface 302 can display the target products to a user as part of the client application 110.

Figure 4:
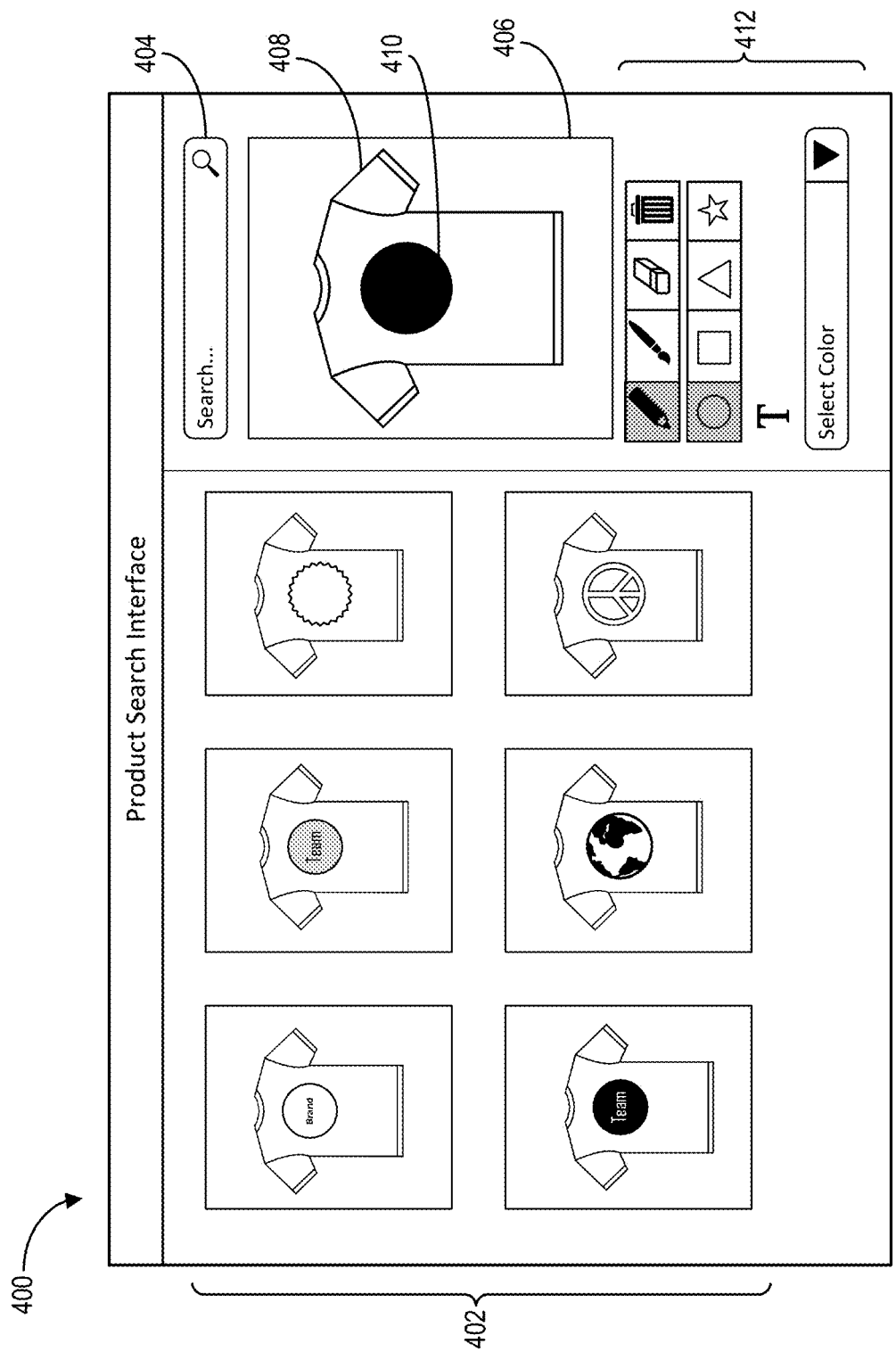
FIGS. 4-9 illustrate an example product search interface including a digital canvas for performing product searches based on gesture input in accordance with one or more embodiments.

As mentioned, the gesture input search system 102 provides a product search interface for performing a product search and displaying results of the product search. FIG. 4 illustrates an example product search interface 400 (e.g., the product search interface 302) that includes various interface elements. As shown, the product search interface 400 includes a display of target products 402, a text input element 404, a digital canvas 406, and editing tools 412. Although not illustrate in FIG. 4, in some embodiments the product search interface 400 further includes an option to initiate the digital canvas 406. In these embodiments, the digital canvas 406 is not displayed by default, but is displayed within the product search interface 400 upon detecting a user selection of the digital canvas option.

In relation to the above discussion, FIG. 4 illustrates an example product search interface 400 whereby a user can perform a product search. More particularly, the gesture input search system 102 provides or presents the product search interface 400 via the client application 110. Thus, the gesture input search system 102 receives user input such as text input within the text input element 404 and gesture input within the digital canvas 406. In some embodiments, the gesture input search system 102 receives additional user input to select one or more of the editing tools 412 for editing the gesture input within the digital canvas 406. For example, the gesture input search system 102 receives a selection of an editing tool that corresponds to (e.g., indicates) a particular visual product feature (e.g., a zipper, a logo, a design, a buckle, or a design) to be added to the digital canvas 406. Other editing tools 412 include color editing tools, eraser tools, brush tools, pen tools, shape tools, delete tools, and crop tools.

As illustrated in FIG. 4, the digital canvas 406 includes a template 408 of a shirt. In other embodiments, however, the digital canvas 406 is blank and the user is allowed to draw a product and any visual product features. As shown, the gesture input search system 102 receives gesture input to place a visual product feature 410 within the template 408 of the digital canvas 406. For example, the gesture input search system 102 receives a selection of a particular logo tool and a particular fill tool and/or color tool within the editing tools 412, and the gesture input search system 102 receives a gesture input such as a tap or click to place the logo as a visual product feature within the template 408.

Based on receiving the gesture input for the visual product feature 410, the gesture input search system 102 analyzes the digital canvas 406 to compare the digital canvas 406 including the visual product feature 410 with representative digital images of product sets within a product repository (e.g., the product repository 114), as described above. The gesture input search system 102 generates confidence scores for the product sets indicating probabilities of the respective representative digital image(s) including the visual product feature 410. For example, the gesture input search system 102 analyzes the representative digital images based on identifying the template 408 of a shirt including the visual product feature 410 of a round logo centrally located within the shirt.

The gesture input search system 102 further determines one or more target products 402 from product sets that correspond to the visual product feature 410 and provides the target products 402 for display within the product search interface 400. In some embodiments, the gesture input search system 102 further provides a sorting element whereby the user can select options to define rules for how to sort (e.g., newest, most relevant, most expensive, least expensive, highest ratings, etc.) the target products 402 within the product search interface 400.

In some embodiments, as discussed above, the gesture input search system 102 determines one or more product sets corresponding to the visual product feature 410 based on a product type associated with the digital canvas 406. To elaborate, the gesture input search system 102 provides an option for a user to select the template 408 (among options to select various digital canvas templates) for the digital canvas 406, where the selection of the option indicates (e.g., via metadata) a product type associated with the selected template 408. Thus, upon receiving the selection, the gesture input search system 102 determines a product type associated with the digital canvas 406 (e.g., "shirt" or "t-shirt") and matches the product type to product sets whose representative digital images depict objects of the same class or product type—i.e., digital images of shirts. Additionally, the gesture input search system 102 further compares those representative digital images of the same product type with the digital canvas 406 to generative confidence scores for, and identify, those representative digital images (and corresponding product sets) that include digital images of products with circular logos centrally located on the shirt.

In addition to gesture input within the digital canvas 406 and selections of editing tools 412, in some embodiments the gesture input search system 102 further receives text-based input via the text input element 404. For example, in these embodiments the gesture input search system 102 receives a text input such as a search query including characters that form one or more words such as "shirt" or "short sleeve shirt." In some embodiments, the gesture input search system 102 generates and/or provides a template (e.g., the template 408) within the digital canvas 406 based on text input. For example, based on received text input of "shirt" or "short sleeve shirt," the gesture input search system 102 provides the template 408 of a shirt within the digital canvas 406. Thus, the gesture input search system 102 further receives gesture input in conjunction with text input.

Based on the received text input within the text input element 404 together with the gesture input within the digital canvas 406 (with or without the template 408), the gesture input search system 102 searches for and identifies the target products 402. For example, the gesture input search system 102 identifies products that correspond to a received text input and further filters those products based on the gesture input to only provide target products 402 that correspond to the text input and that also include visual product features indicated by the gesture input. In some embodiments, the gesture input search system 102 determines a product type from text input and identifies product sets that correspond to the product type of the text input. In these or other embodiments, the gesture input search system 102 further identifies, from among the product sets having the same (or similar) product type, product sets that also include visual product features indicated by gesture input. Thus, the gesture input search system 102 provides target products (e.g., target products 402) from one or more product sets based on a combination of text input and gesture input.

Figure 5A:
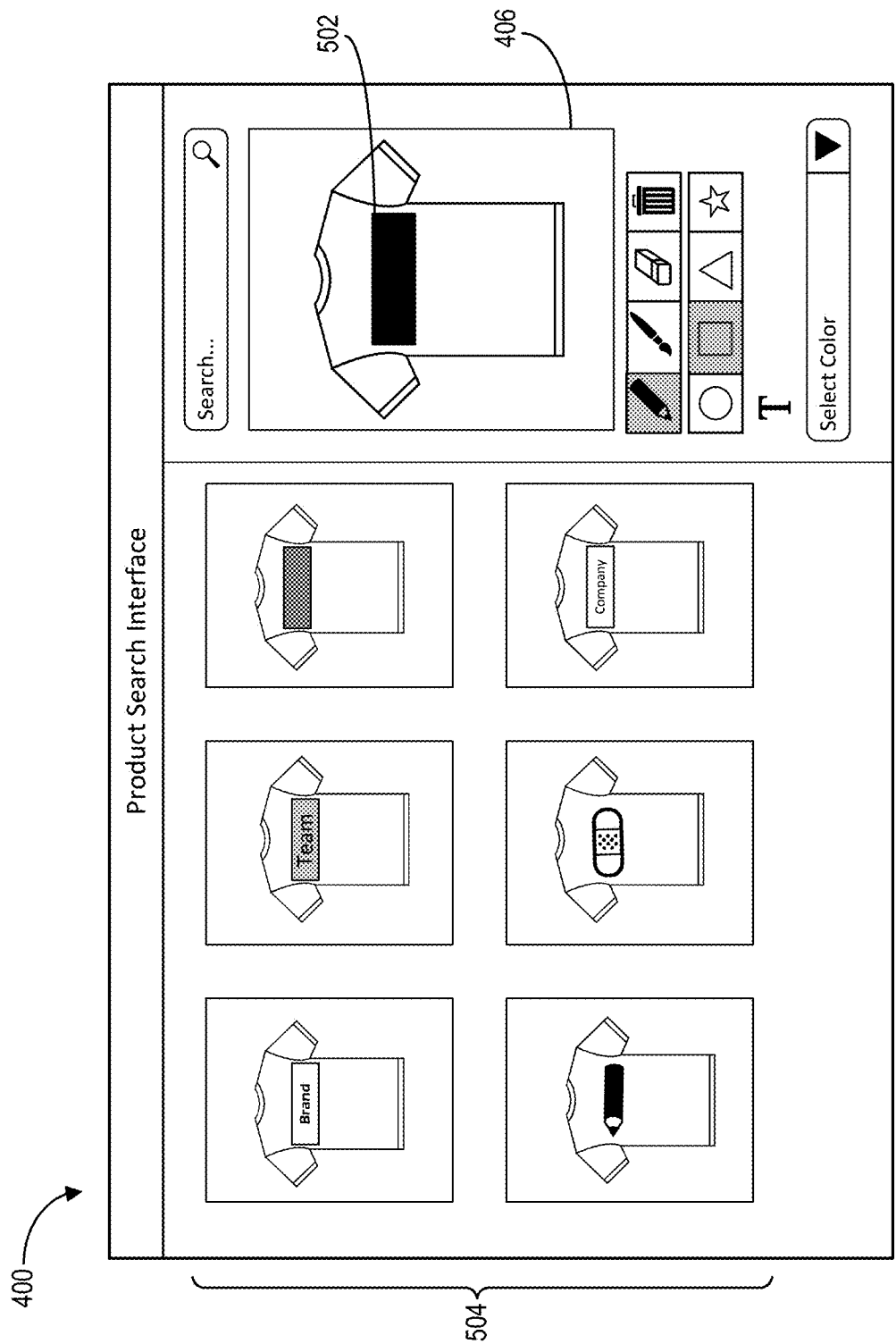

As mentioned, the gesture input search system 102 receives gesture input to select or create a new visual product feature. As shown in FIG. 5A the gesture input search system 102 receives a selection of a rectangular logo tool (as indicated by the dark shade or highlight of the editing tool in FIG. 5A). In addition, the gesture input search system 102 receives a gesture input to place a rectangular logo within the digital canvas 406.

Based on identifying the new visual product feature 502 within the digital canvas 406, the gesture input search system 102 determines confidence scores for the product sets within the product repository 114 and identifies one or more product sets that correspond to the visual product feature 502. For example, the gesture input search system 102 identifies one or more product sets whose representative digital images include the visual product feature 502 and/or include a product of a matching product type of the digital canvas 406. Further, the gesture input search system 102 generates the target products 504 (including rectangular logos centrally located within the shirts to match the visual product feature 502 within the digital canvas 406) from the corresponding product sets and enables the user to sort, select, and/or purchase the target products 504 within the product search interface 400. Indeed, in some embodiments, the gesture input search system 102 provides a purchase option within the product search interface 400 so that, upon selection of a target product within the target products 504, the gesture input search system 102 can facilitate the purchase of the target product without redirecting the user away from the product search interface 400.

Figure 5B:
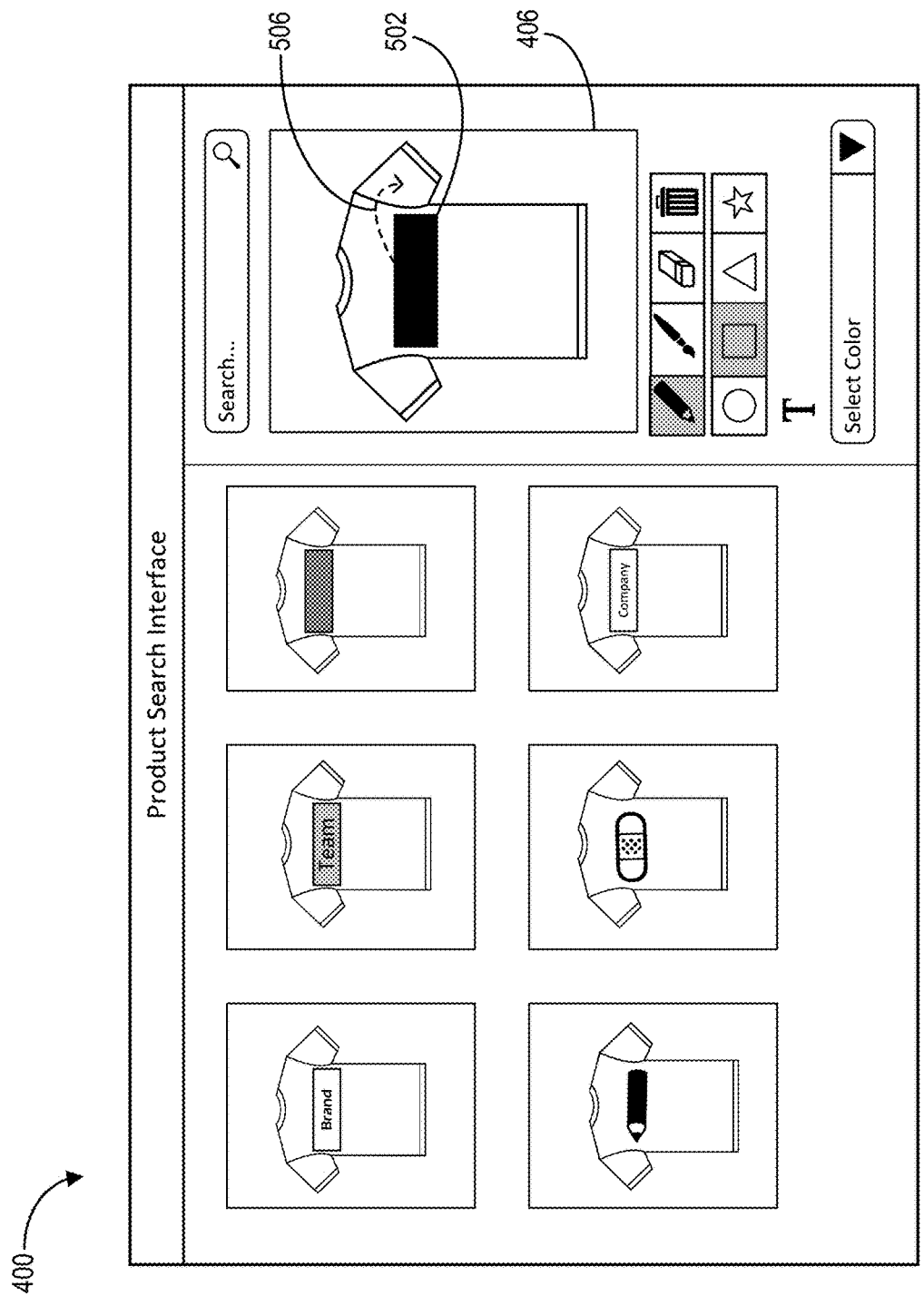

As further mentioned, the gesture input search system 102 receives gesture input to modify a visual product feature. Indeed, FIG. 5B illustrates a gesture input 506 to modify the visual product feature 502. In some embodiments, the gesture input search system 102 receives a gesture input such as a tap or swipe to create a modified visual product feature by changing the location, rotation, size, or shape of the visual product feature 502. As illustrated in FIG. 5B, the gesture input search system 102 receives a gesture input to move the visual product feature 502 to a new location on the sleeve of the shirt within the digital canvas 406.

Figure 5C:
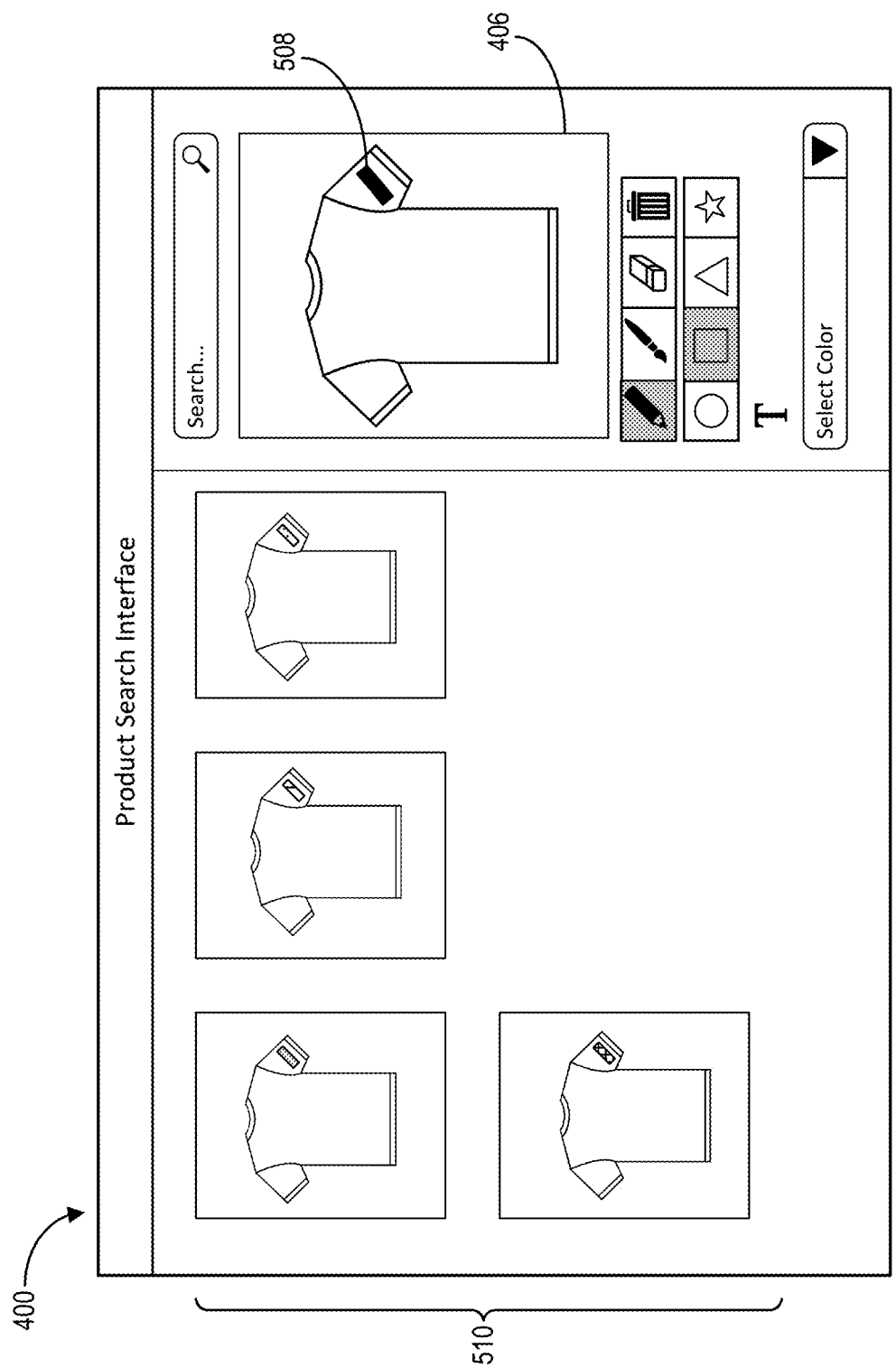

Based on identifying the modified visual product feature, or based on detecting the gesture input to change the visual product feature 502, the gesture input search system 102 generates a new set of target products for display within the product search interface 400. Indeed, FIG. 5C illustrates the product search interface 400 including the target products 510 that include logos located on the sleeves of shirts to match the visual product feature 508 (e.g., the modified version of the visual product feature 502). Thus, the gesture input search system 102 receives gesture input to modify visual product features, and in response, determines target products from product sets that corresponding to the modified visual product features.

Figure 6:
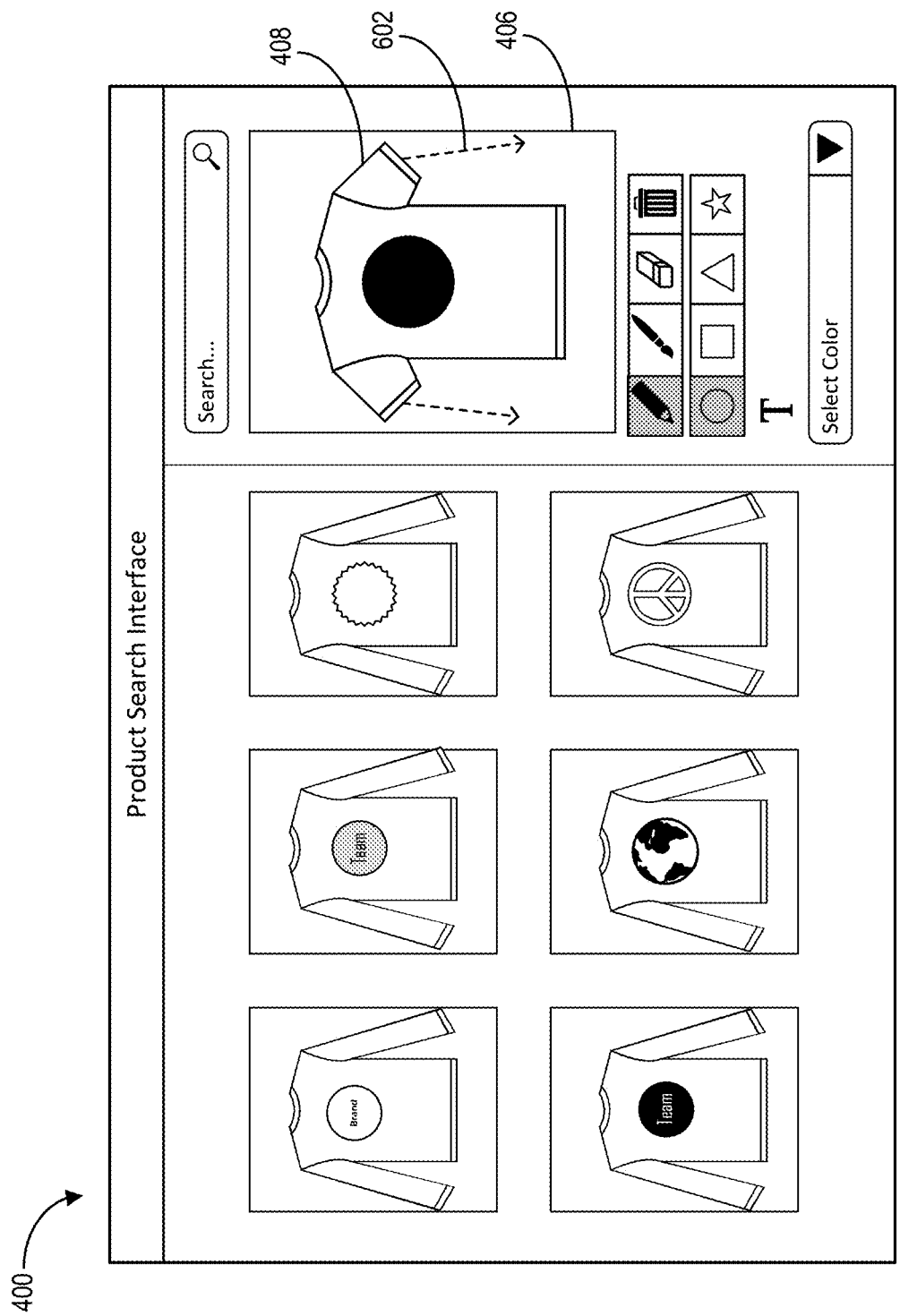

As mentioned, the gesture input search system 102 provides a digital canvas 406 that includes a modifiable template. Indeed, FIG. 6 illustrates the digital canvas 406 within the product search interface 400 and including the template 408 of a shirt. In some embodiments, the template 408 is modifiable by gesture input. To elaborate, the gesture input search system 102 receives gesture input to change the template such as, for example, changing the length of the sleeves of the template 408. As illustrated in FIG. 6, for instance, the gesture input search system 102 receives a gesture input 602 to change the template 408 from a short sleeve shirt to a long sleeve shirt.

Based on receiving the gesture input 602 to modify the template 408 of the digital canvas 406, the gesture input search system 102 determines product sets that correspond to the digital canvas 406 by identifying representative digital images of product sets that include long sleeve shirts with a round logo centrally located on the shirt. For example, the gesture input search system 102 analyzes the digital canvas 406 to determine that new product sets need to be identified that correspond to the digital canvas 406 as modified by the gesture input 602 to lengthen the sleeves of the shirt. The gesture input search system 102 further identifies product sets (or representative digital images of product sets) that correspond to the new product type. In addition, the analyzes the identified product sets to identify those product sets that include centrally located circular logos.

In some embodiments, the gesture input search system 102 identifies more than one visual product feature within the digital canvas 406. For example, from FIG. 6, the gesture input search system 102 identifies a first visual product feature for long sleeves and a second visual product feature for the centrally located circular logo. Based on these two visual product features, in some embodiments the gesture input search system 102 identifies a first product set that corresponds to the first visual product feature (e.g., a product set that includes digital images of long sleeve shirts) and further identifies a second product set that corresponds to the second visual product feature (e.g., a product set that includes shirts with centrally located circular logos). To generate and provide target products based on two (or more) visual product features, the gesture input search system 102 determines an intersection between the product sets corresponding to the respective visual product features. Thus, the gesture input search system 102 provides target products from either or both of the product sets whose digital images include long sleeve shirts and centrally located circular logos.

In some embodiments, the gesture input search system 102 utilizes product types to identify product sets that correspond to what is shown within the digital canvas 406. For example, the gesture input search system 102 can determine a product type (e.g., shirt with short sleeves) and conduct a search based on the product type (e.g., short sleeve shirts) in conjunction with a visual product feature (e.g., drawing of a logo location).

In other embodiments, however, the gesture input search system 102 does not utilize product types, but instead treats all gesture input within the digital canvas 406 as a visual product feature. For example, the gesture input search system 102 can analyze the digital canvas 406 to determine that the digital canvas 406 illustrates a visual product feature of a long sleeve on a shirt with a centrally located circular logo. Indeed, in some embodiments the gesture input search system 102 treats the long sleeve shirt with a centrally located circular logo as a single visual product feature to search for a corresponding product set that includes digital images of long sleeve shirts with centrally located circular logos. The gesture input search system 102 thus compares the digital canvas 406 with the representative digital images of product sets to generate confidence scores and identify corresponding product sets, in accordance with the above description.

Figure 7:
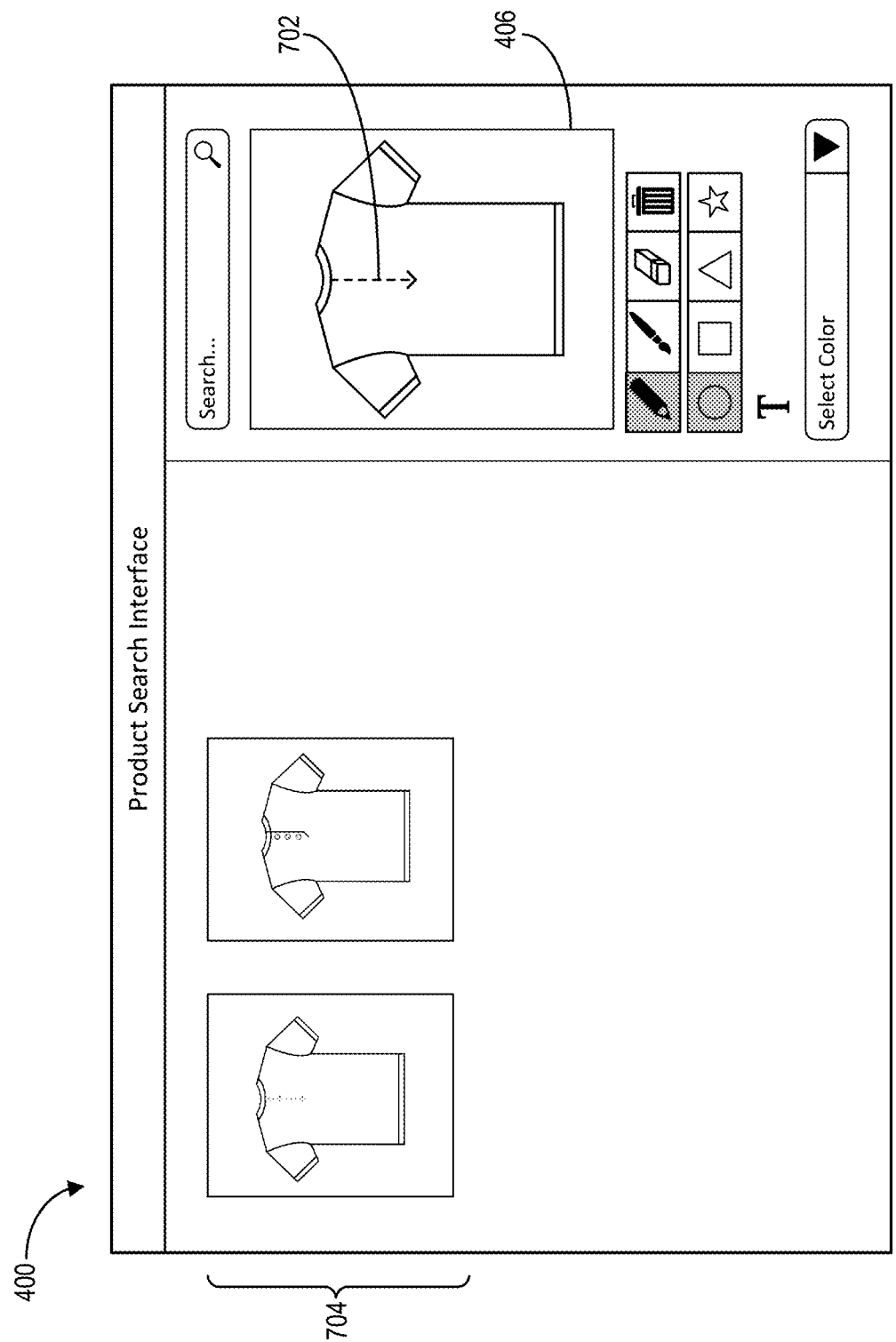

As another example of visual product features within the digital canvas 406, FIG. 7 illustrates a gesture input 702 indicating a zipper of a particular length centrally located from the collar of the shirt. Indeed, similar to the above descriptions, the gesture input search system 102 receives a gesture input to indicate a visual product feature within the digital canvas 406. In some embodiments, the gesture input search system 102 first receives a selection of a zipper tool to determine that the visual product feature of the gesture input 702 is a zipper and thereby search product sets for shirts with corresponding zippers. In other embodiments, however, the gesture input search system 102 analyzes the digital canvas 406 without any predetermination that the gesture input indicated a zipper.

Indeed, FIG. 7 illustrates the product search interface 400 including the target products 704 corresponding to the gesture input 702. As shown in FIG. 7, the gesture input search system 102 generates the target products 704 in response to the gesture input 702 in real time or near real time. In other words, the gesture input search system 102 compares the digital canvas 406 including any visual product features with representative digital images of product sets and identifies one or more product sets (e.g., that satisfy a confidence score threshold or that is a highest ranked) corresponding to the gesture input 702 as the user provides the gesture input 702. In other embodiments, the gesture input search system 102 generates the target products 704 upon detecting a selection of a search option to initiate a product search.

Figure 8:
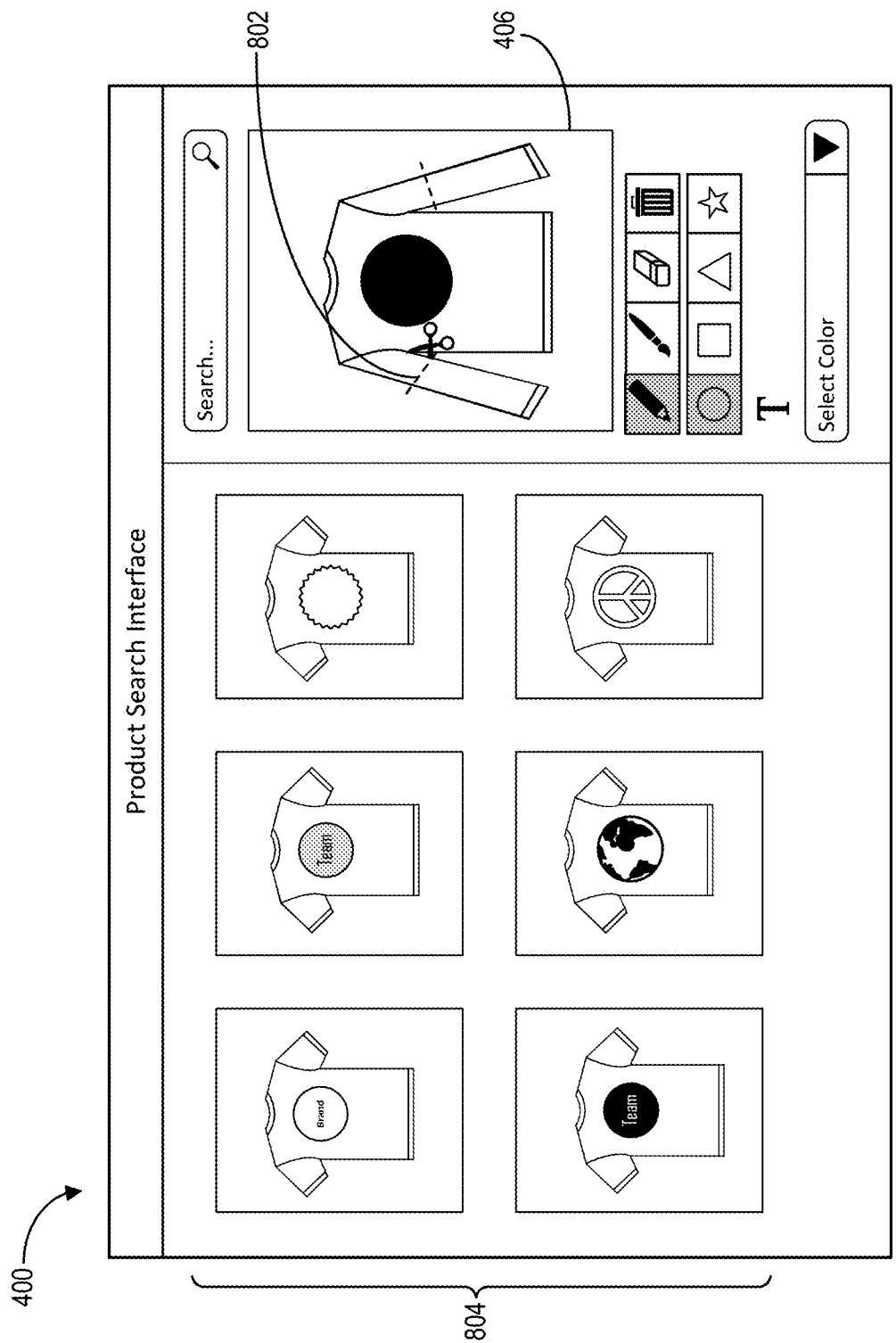

FIG. 8 illustrates another example of a gesture input 802 to modify a visual product feature and/or to modify a template of the digital canvas 406. For instance, in relation to FIG. 8, the gesture input search system 102 detects a user input to select a scissors tool to cut the sleeves off of the long sleeve shirt shown within the digital canvas 406. Thus, the gesture input search system 102 determines the modified visual product feature (or the modified template) and generates the target products 804 with short sleeves in accordance with the above description.

Rather than providing a scissors tool, in some embodiments, the gesture input search system 102 determines user interaction directly with the sleeves. For example, in some embodiments, the gesture input search system 102 identifies a user drawing a shortened (or lengthened) sleeve (e.g., without a scissor tool). Thus, although FIG. 8 illustrates a particular user interface scissor tool, the gesture input search system 102 can detect drawing input directly indicating a visual product feature without such a tool.

Figure 9:
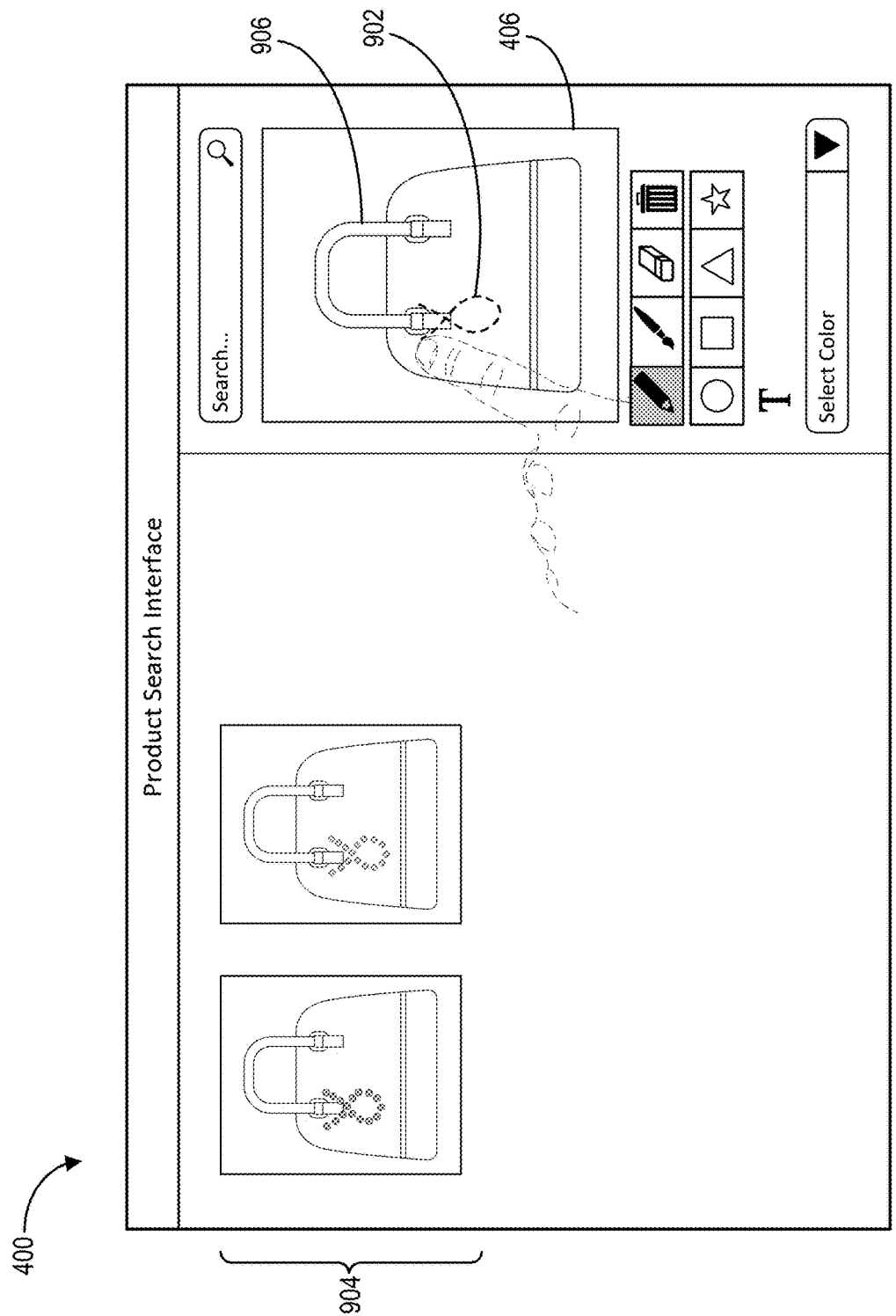

Although FIGS. 4-8 illustrate an example product search interface 400 for performing various product searches in relation to shirts, the gesture input search system 102 can perform product searches for other products as well. Similar to the above figures, FIG. 9 illustrates the product search interface 400 including the digital canvas 406. However, the digital canvas 406 in FIG. 9 illustrates a template 906 (or, in some embodiments, a user illustration) of a purse rather than a shirt. In addition, FIG. 9 illustrates a gesture input 902 of a design that the user is drawing (e.g., using a finger) within the digital canvas 406. Based on receiving the gesture input 902 indicating the visual product feature on the purse, the gesture input search system 102 generates the target products 904 in accordance with the techniques described herein.

To elaborate, as described above, the gesture input search system 102 utilizes digital image classification models (e.g., the digital image classification models 206a-206n) to generate product sets for products with a product repository (e.g., the product repository 114), some of which include digital images of purses corresponding to various visual product features. The gesture input search system 102 further determines representative images for the product sets, including product sets of purses. In addition, the gesture input search system 102 compares the digital canvas 406 including the visual product feature (e.g., the design on the purse) with the representative digital images of product sets corresponding to individual digital image classification models. In particular, the gesture input search system 102 determines confidence scores for the product sets that indicate respective probabilities that the product sets include products and visual product features that correspond to (e.g., visually match or are visually similar to) those illustrated in the digital canvas 406 via the gesture input 902. The gesture input search system 102 further generates the target products 904 (the purses with the designs) from the product set(s) identified as corresponding to the gesture input 902. Other than shirts and purses, the gesture input search system 102 can facilitate product searches for any other product using the method and techniques described herein.

Likewise, the gesture input search system 102 identifies, and generates target products based on, a wide variety of visual product features beyond those illustrated in FIGS. 4-9. For example, the gesture input search system 102 identifies visual product features including various locations, rotations, sizes, and shapes of objects such as logos, zippers, laces, designs, seams, laces, holes, etc., as mentioned above.

To generate target products from a product repository (e.g., the product repository 114), the gesture input search system 102 generates or classifies product sets. As mentioned, the gesture input search system 102 implements digital image classification models to classify product sets. In some embodiments, the gesture input search system 102 generates a single product set corresponding to a single digital image classification model—i.e., each digital image classification model classifies a separate product set. In other embodiments, however, the gesture input search system 102 utilizes multiple digital image classification models for a single product set. To generate the product sets, the gesture input search system 102 further trains the digital image classification models to classify digital images into respective product sets.

Figure 10:
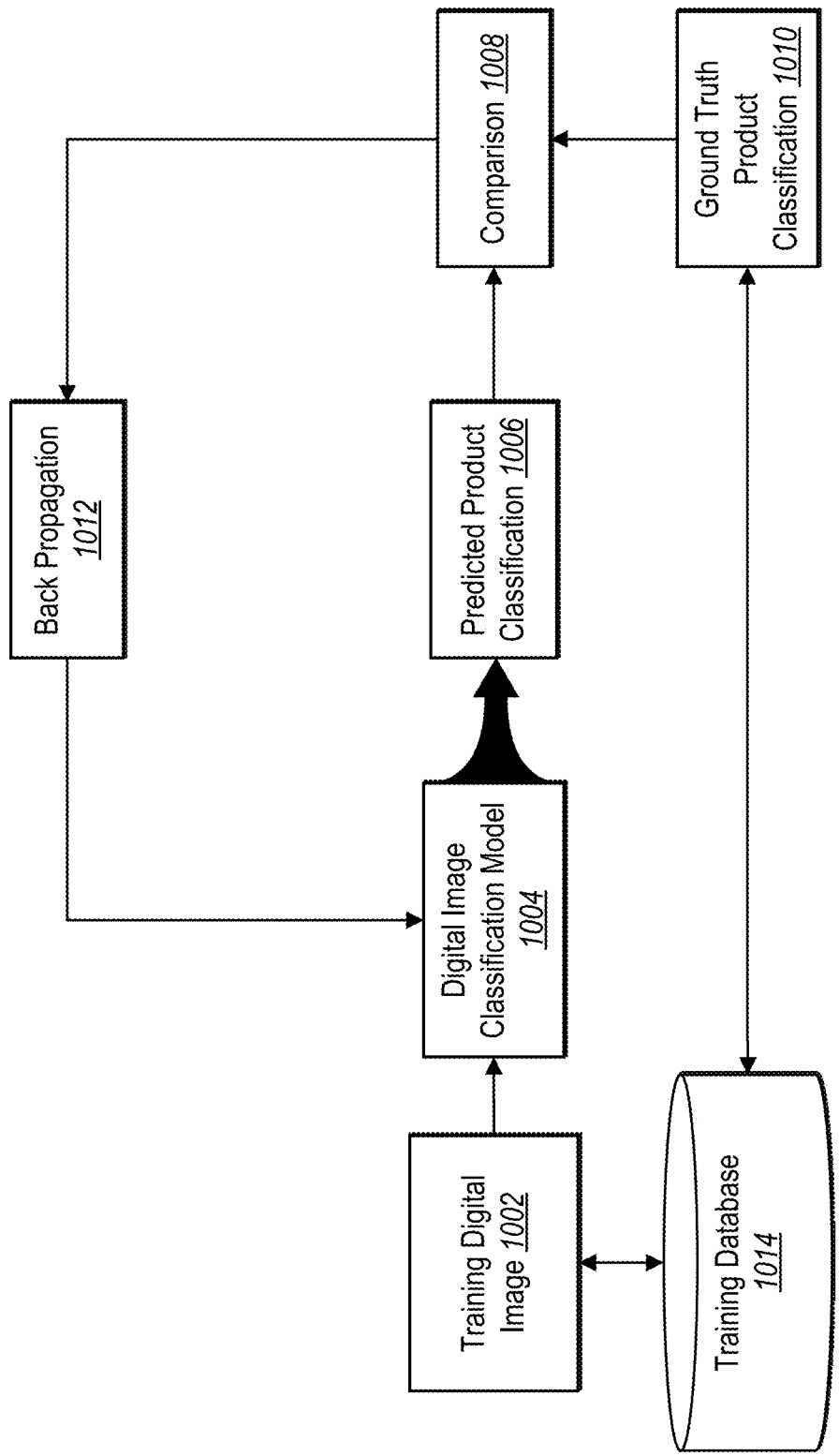
FIG. 10 illustrates an example process for training a digital image classification model in accordance with one or more embodiments.

FIG. 10 illustrates an example process by which the gesture input search system 102 trains a digital image classification model 1004 to classify digital images into product sets in accordance with one or more embodiments. As illustrated, the gesture input search system 102 trains the digital image classification model 1004 to generate accurate predictions of classifications or product sets. Particularly, the gesture input search system 102 accesses a training digital image 1002 within a training database 1014 to utilize as training data for the digital image classification model 1004. In addition, the gesture input search system 102 inputs the training digital image 1002 into the digital image classification model 1004, whereupon the digital image classification model 1004 generates a predicted product classification 1006. Indeed, the digital image classification model 1004 analyzes the training digital image 1002 utilizing the various internal layers, neurons, and weights associated with the digital image classification model 1004. Based on the analysis of the training digital image 1002, the digital image classification model 1004 generates a predicted product classification 1006 for the training digital image 1002. For example, the digital image classification model 1004 predicts a product set for the training digital image 1002 by identifying or discerning a product and/or visual product feature portrayed within the training digital image 1002.

In addition, the gesture input search system 102 accesses a ground truth product classification 1010 from the training database 1014 and that corresponds to the training digital image 1002. More specifically, the gesture input search system 102 identifies a product set that is the actual or ground truth classification of the training digital image 1002. Indeed, the gesture input search system 102 stores, within the training database 1014, training data that includes training digital images and corresponding ground truth classifications or product sets.

Based on the identifying the ground truth product classification 1010, the gesture input search system 102 further implements a comparison 1008. For example, the gesture input search system utilizes a determination of error or loss to compare the ground truth product classification 1010 with the predicted product classification 1006. Particularly, to compare the predicted product classification 1006 with the ground truth product classification 1010, the gesture input search system 102 utilizes a loss function such as a cross entropy loss function, a mean square error loss function, a Kullback-Liebler loss function, or some other appropriate loss function. Thus, the gesture input search system 102 determines an error or measure of loss associated with the digital image classification model 1004. By generating a loss determination for the comparison 1008, the gesture input search system 102 determines an accuracy of the digital image classification model 1004 as well as a degree to which the digital image classification model 1004 needs to be adjusted to improve the accuracy.

As further illustrated in FIG. 10, the gesture input search system 102 further implements a back propagation 1012. In particular, based on the determined error or measure of loss associated with the digital image classification model 1004, the gesture input search system 102 performs one or more modifications to reduce or minimizes the error or measure of loss. For example, the gesture input search system 102 modifies weights associated with various neurons within layers of the digital image classification model 1004 to adjust internal neuron-specific outputs and thereby affect the final generated output associated with the digital image classification model 1004.

Upon modifying weights associated with the digital image classification model 1004 as part of the back propagation 1012, the gesture input search system 102 identifies another training digital image and its corresponding ground truth product classification from the training database 1014 to input into the digital image classification model 1004. The digital image classification model 1004, in turn, generates another predicted product classification. In addition, the gesture input search system 102 generates implements another comparison to determine to what extent the digital image classification model 1004 needs to be adjusted to further increase its accuracy in generating predicted product classifications. Further, the gesture input search system 102 implements another back propagation to modify weights of the digital image classification model 1004 to yet further reduce the error associated with the digital image classification model 1004. By repeating the process illustrated in FIG. 10 in this way (e.g., for several or many iterations or epochs), the gesture input search system 102 improves the accuracy of the digital image classification model 1004 until the digital image classification model 1004 generates predicted product classifications that are within a threshold similarity of ground truth product classifications—or until the error associated with digital image classification model 1004 is below a particular error threshold.

In some embodiments, the gesture input search system 102 trains and utilizes a specific digital image classification model to classify digital images of products from a product repository (e.g., the product repository 114). In some embodiments, the gesture input search system 102 implements and modifies a pretrained image classification model such as GOOGLE's Inception model to classify digital images into product sets. Indeed, in some embodiments, the gesture input search system 102 downloads (based on a script of a particular programming language such as Python) a pretrained model such as the Inception model. In addition, based on the pretrained model, the gesture input search system 102 adds a new final layer to the pretrained image classification model and trains the new final layer based on training digital images of products.

Figure 11:
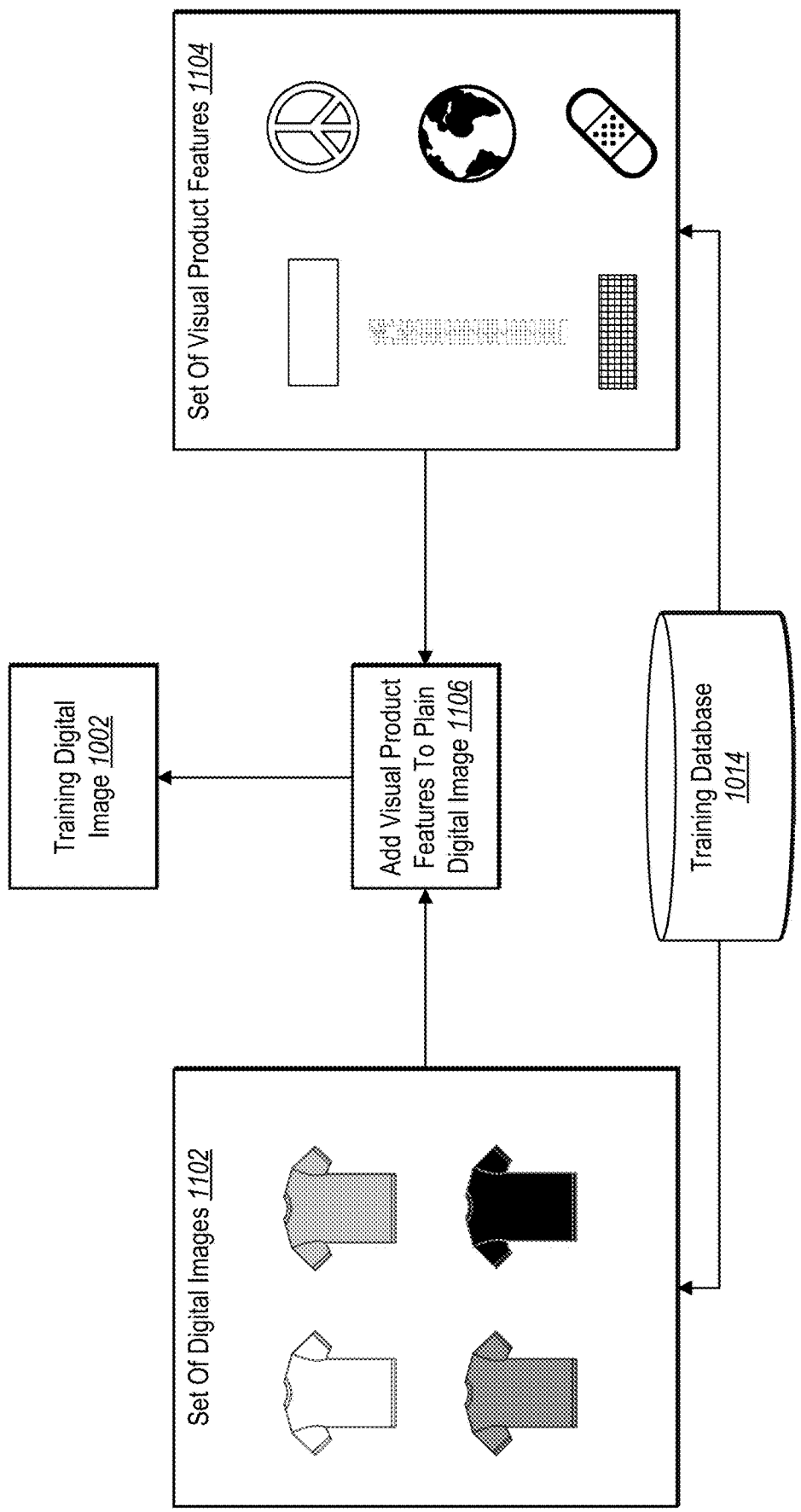
FIG. 11 illustrates an example process of generating training data for a digital image classification model in accordance with one or more embodiments.

As mentioned, the gesture input search system 102 further generates training data to utilize in training a digital image classification model (e.g., the digital image classification model 1004). Specifically, the gesture input search system 102 generates training digital images such as the training digital image 1002. FIG. 11 illustrates an example process by which the gesture input search system 102 generates the training digital image 1002 (or other training digital images).

As illustrated in FIG. 11, the gesture input search system 102 generates the training digital image 1002 based on data from the training database 1014. In some embodiments, the training database 1014 is part of the product repository 114, while in other embodiments, the training database 1014 is separate from the product repository 114. To generate the training digital image 1002, the gesture input search system 102 identifies or generates a set of digital images 1102. In particular, the gesture input search system 102 generates a set of plain or generic digital images of products (e.g., shirts in the example) having different colors (e.g., generated by changing color balances of digital images) and orientations, including placeholder information for each possible configuration—e.g., bounds of placeholders where logos could be superimposed.

In addition, the gesture input search system 102 accesses the training database 1014 to generate or identify a set of visual product features 1104. Particularly, the gesture input search system 102 generates visual product features that could be superimposed onto the digital images within the set of digital images 1102. As illustrated in FIG. 11, the gesture input search system 102 generates a set of visual product features 1104 including various logos, zippers, and stitches having different sizes, shapes, rotations, and locations.

Based on the set of digital images 1102 and the set of visual product features 1104, the gesture input search system 102 performs an act 1106 to add the visual product features to the plain digital images of the set of digital images 1102. In particular, the gesture input search system 102 generates a training digital image 1002 by superimposing a particular visual product feature onto a plain digital image. Thus, by generating training digital images of many configurations with many variations of color, orientation, shape, and size of visual product features, the gesture input search system 102 can utilize the training digital images to train digital image classification models to classify digital images of products from the product repository into product sets. For example, the gesture input search system 102 generates training digital images of shirts with no logos, centrally located logos, logos on the bottom-left, logos on the bottom-right, and logos on the sleeve to utilize as training data for training digital image classification models.

In addition to generating training digital images for the positive case (where digital images of products include visual product features), the gesture input search system 102 also generates training digital images to train digital image classification models in negative cases as well. To illustrate, the gesture input search system 102 generates training digital images that specifically do not include particular visual product features and trains corresponding digital image classification models to generate product sets based on what visual product features digital images of products do not depict as opposed to what they do depict. For example, to train a digital image classification model to identify digital images of shirts including logos on the sleeve, the gesture input search system 102 generates one or more negative sets of training digital images (e.g., training digital images that include visual product features other than the visual product feature of a respective product set), where the sets of training digital images include shirts with no logos, shirts with logos in the center, and shirts with logos on the bottom. Indeed, the gesture input search system 102 generates negative training digital images to train a digital image classification model to recognize digital images that do not belong to the respective product set.

Figure 12:
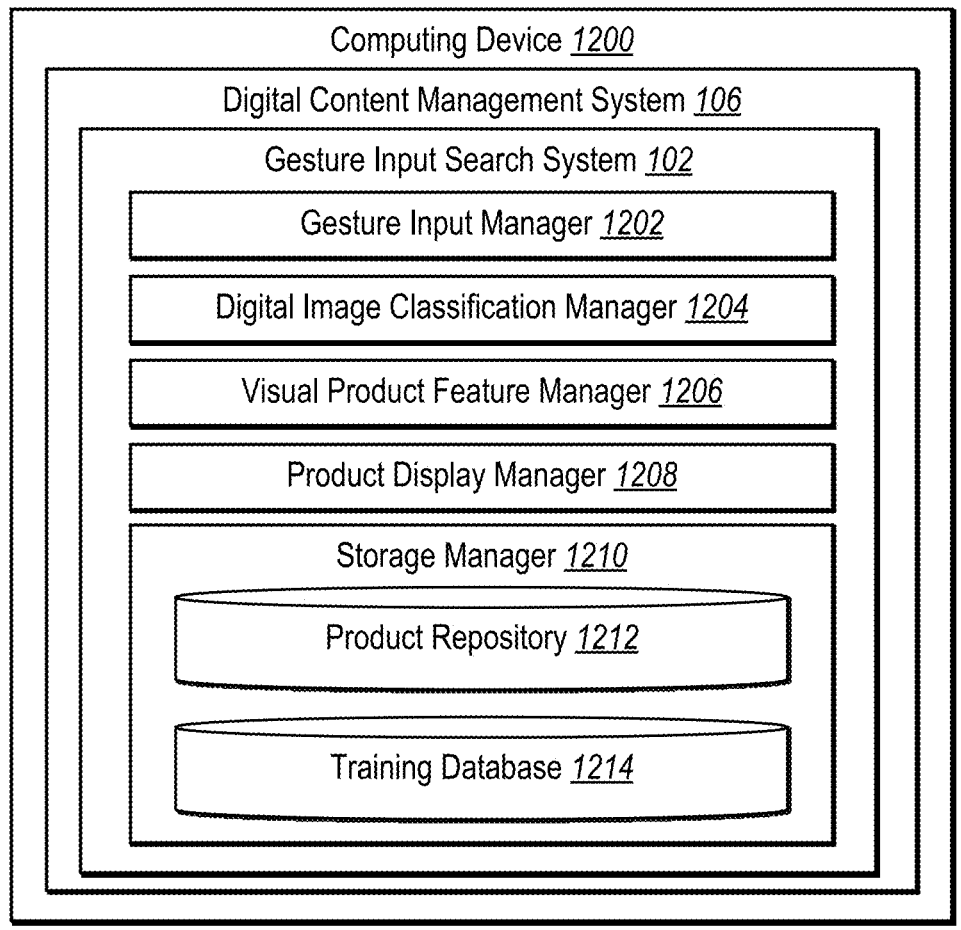
FIG. 12 illustrates a schematic diagram of a gesture input search system in accordance with one or more embodiments.

Looking now to FIG. 12, additional detail will be provided regarding components and capabilities of the gesture input search system 102. Specifically, FIG. 12 illustrates an example schematic diagram of the gesture input search system 102 on an example computing device 1200 (e.g., one or more of the client device 108 and/or the server(s) 104). As shown in FIG. 12, the gesture input search system 102 may include a gesture input manager 1202, a digital image classification manager 1204, a visual product feature manager 1206, a product display manager 1208, and a storage manager 1210.

As just mentioned, the gesture input search system 102 includes a gesture input manager 1202. In particular, the gesture input manager 1202 receives, identifies, or detects gesture input via a digital canvas. For example, the gesture input manager 1202 receives gesture input as part of a product search. Based on the gesture input, the gesture input manager 1202 further identifies, determines, or generates one or more visual product features indicated by the gesture input. For example, the gesture input manager 1202 recognizes shapes, locations, sizes, and rotations of objects drawn within a digital canvas using gesture input.

As illustrated, the gesture input search system 102 further includes a digital image classification manager 1204. In particular, the digital image classification manager 1204 generates, classifies, labels, determines, or identifies product sets. For example, the digital image classification manager 1204 communicates with the storage manager 1210 and analyzes digital images of products within the product repository 1212 (e.g., the product repository 114) to identify objects and classify the digital images into product sets based on products identified within the digital images. Additionally, the digital image classification manager 1204 generates, determines, or identifies representative digital images for the product sets. In some embodiments, the digital image classification manager 1204 further labels or classifies the product sets with a product type. Further, the digital image classification manager 1204 trains the digital image classification models to classify digital images. For example, the digital image classification manager 1204 communicates with the storage manager 1210 to access the training database 1214 for training data to train digital image classification models. In addition, the digital image classification manager 1204 generates training data such as training digital images to store within the training database 1214.

As shown, the gesture input search system 102 further includes a visual product feature manager 1206. In particular, the visual product feature manager 1206 determines, generates, or identifies product sets that corresponding to a gesture input. In particular, the visual product feature manager 1206 compares representative digital images of product sets with the visual product features of the gesture input to determine confidence scores and ultimately determine or identify one or more product sets whose confidence scores indicate a close enough correlation with the gesture input. For example, the visual product feature manager 1206 identifies those representative digital images (and corresponding product sets) that include depictions of the visual product features drawn by the gesture input in the digital canvas.

As shown, the gesture input search system 102 further includes a product display manager 1208. In particular, the product display manager 1208 provides, presents, or displays a product search interface as part of a website or application. The product display manager 1208 provides a digital canvas, a text input element, editing tools, and target products that are a result of a product search. In some embodiments, the product display manager 1208 displays target products upon receiving a user input to initiate a product search. In these or other embodiments, the product display manager 1208 displays, and updates the presentation of, the target products contemporaneously with modifications to visual product features via gesture input to reflect new target products that correspond to any modified visual product features in real time (or near real time).

In one or more embodiments, each of the components of the gesture input search system 102 are in communication with one another using any suitable communication technologies. Additionally, the components of the gesture input search system 102 can be in communication with one or more other devices including one or more client devices described above. It will be recognized that although the components of the gesture input search system 102 are shown to be separate in FIG. 12, any of the subcomponents may be combined into fewer components, such as into a single component, or divided into more components as may serve a particular implementation. Furthermore, although the components of FIG. 12 are described in connection with the gesture input search system 102, at least some of the components for performing operations in conjunction with the gesture input search system 102 described herein may be implemented on other devices within the environment.

The components of the gesture input search system 102 can include software, hardware, or both. For example, the components of the gesture input search system 102 can include one or more instructions stored on a computer-readable storage medium and executable by processors of one or more computing devices (e.g., the computing device 1200). When executed by the one or more processors, the computer-executable instructions of the gesture input search system 102 can cause the computing device 1200 to perform the methods described herein. Alternatively, the components of the gesture input search system 102 can comprise hardware, such as a special purpose processing device to perform a certain function or group of functions. Additionally or alternatively, the components of the gesture input search system 102 can include a combination of computer-executable instructions and hardware.

Furthermore, the components of the gesture input search system 102 performing the functions described herein may, for example, be implemented as part of a stand-alone application, as a module of an application, as a plug-in for applications including content management applications, as a library function or functions that may be called by other applications, and/or as a cloud-computing model. Thus, the components of the gesture input search system 102 may be implemented as part of a stand-alone application on a personal computing device or a mobile device. Alternatively or additionally, the components of the gesture input search system 102 may be implemented in any application that allows creation and delivery of marketing content to users, including, but not limited to, applications in ADOBE CREATIVE CLOUD or ADOBE MARKETING CLOUD, such as ADOBE ILLUSTRATOR, ADOBE PHOTOSHOP, ADOBE CAMPAIGN, and ADOBE ANALYTICS. "ADOBE," "ILLUSTRATOR," "PHOTOSHOP," "CAMPAIGN," and "ANALYTICS" are registered trademarks of Adobe Inc. in the United States and/or other countries.

FIGS. 1-12, the corresponding text, and the examples provide a number of different systems, methods, and non-transitory computer readable media for generating product search results based on gesture input received via a digital canvas. In addition to the foregoing, embodiments can also be described in terms of flowcharts comprising acts for accomplishing a particular result. For example, FIG. 13 illustrates a flowchart of an example sequence of acts in accordance with one or more embodiments.

Figure 13:
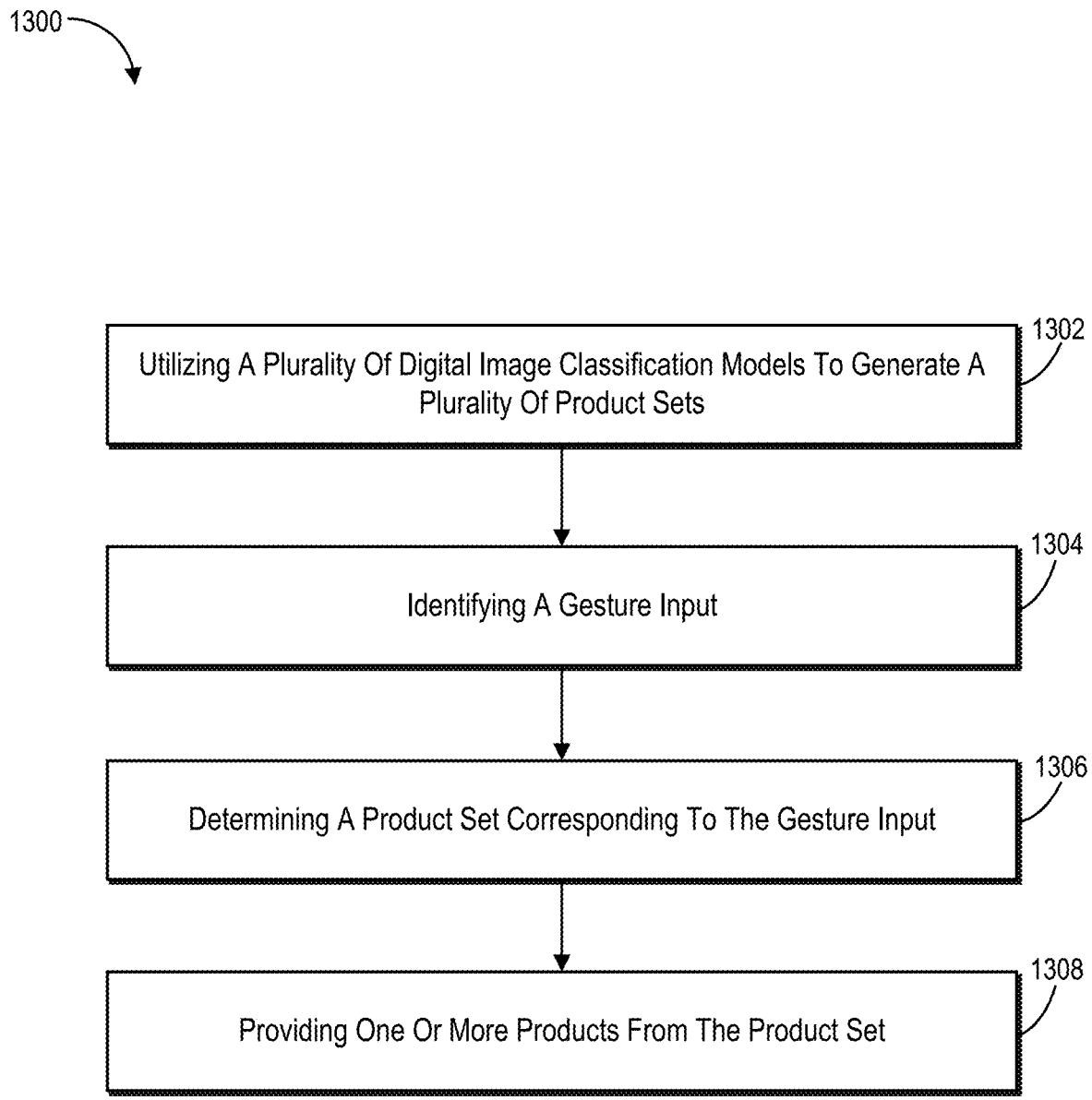
FIG. 13 illustrates a flowchart of a series of acts for generating and providing target products for a product search based on gesture input in accordance with one or more embodiments.

While FIG. 13 illustrates acts according to one embodiment, alternative embodiments may omit, add to, reorder, and/or modify any of the acts shown in FIG. 13. The acts of FIG. 13 can be performed as part of a method. Alternatively, a non-transitory computer readable medium can comprise instructions, that when executed by one or more processors, cause a computing device to perform the acts of FIG. 13. In still further embodiments, a system can perform the acts of FIG. 13. Additionally, the acts described herein may be repeated or performed in parallel with one another or in parallel with different instances of the same or other similar acts.

FIG. 13 illustrates an example series of acts 1300 for generating and providing target products for a gesture-input-based product search. As shown, the series of acts 1300 includes an act 1302 of utilizing a plurality of digital image classification models to generate a plurality of product sets. In particular, the act 1302 can include utilizing a plurality of digital image classification models to generate a plurality of product sets from a product repository, wherein each of the plurality of digital image classification models is trained to identify a unique visual product feature.

As illustrated, the series of acts 1300 also includes an act 1304 of identifying a gesture input. In particular, the act 1304 can include identifying, via a digital canvas, a gesture input indicating a visual product feature of a target product. The digital canvas can include a product template illustrating the target product, wherein the product template is modifiable by gesture inputs. In addition, a visual product feature can include one or more of a presence of an object within the target product, a location of an object within the target product, a shape of an object within the target product, a size of an object within the target product, or a rotation of an object within the target product. Further, the act 1304 can involve determining gesture input of a location for an object within the target product.

As further illustrated in FIG. 13, the series of acts 1300 includes an act 1306 of determining a product set corresponding to the gesture input. In particular, the act 1306 can include determining, via an input-classifier matching model and based on the gesture input, a first product set from the plurality of product sets, the first product set corresponding to a first digital image classification model from the plurality of digital image classification models, the first digital image classification model trained to identify the visual product feature. For example, the act 1306 can involve utilizing the input-classifier matching model to determine, for a plurality of digital image classification models corresponding to a plurality of product sets, confidence scores indicating probabilities that the digital image classification models correspond to the gesture input and identifying, based on the confidence scores for the plurality of digital image classification models, a product set corresponding to a digital image classification model that classifies digital images based on the visual product feature. The act 1306 can also (or alternatively) involve comparing the target product including the visual product feature indicated by the gesture input with representative digital images corresponding to the plurality of product sets.

The act 1306 can still further involve analyzing the representative digital images of the plurality of product sets to generate confidence scores for the plurality of product sets, the confidence scores indicating probabilities that the plurality of product sets correspond to the gesture input and identifying, from among the representative digital images of the plurality of product sets and based on the confidence scores, a representative digital image of the first digital image classification model that depicts the visual product feature indicated by the gesture input. The act 1306 can further involve determining, based on comparing the target product including the visual product feature indicated by the gesture input with the representative digital images from the plurality of product sets, probabilities that the product sets include digital images that depict product types corresponding to the target product and that include the visual product feature indicated by the gesture input. Indeed, the gesture input can include a location for an object within the target product, and the act 1306 can involve determining the confidence scores for the plurality of digital image classification models based on the location for the object within the target product.

Further, the series of acts 1300 includes an act 1308 of providing one or more products from the product set. In particular, the act 1308 can include providing, for display, one or more products from the first product set corresponding to the first digital image classification model. For example, the act 1308 can involve providing, for display, one or more digital images from the product set corresponding to the digital image classification model that classifies digital images based on the visual product feature.

The series of acts 1300 can further include an act of providing the digital canvas for display within a product search interface of a web site together with one or more digital images of the one or more target products. For example, the act can involve providing the digital canvas for display within a product search interface of a web site together with the one or more digital images from the product set corresponding to the digital image classification model that classifies digital images based on the visual product feature. Additionally, the series of acts 1300 can include an act of receiving a second gesture input of a modified visual product feature of the target product. The series of acts 1300 can further include an act of determining, via the input-classifier matching model and based on the second gesture input, a second product set from the plurality of product sets, the second product set corresponding to a second digital image classification model from the plurality of digital image classification models, the second digital image classification model trained to identify the target product including the modified visual product feature.

Additionally, the series of acts 1300 can include an act of receiving, via a text input element, a text-based search query. Further, the series of acts 1300 can include an act of determining, via the input-classifier matching model and based on the gesture input and the text-based search query, a third product set from the plurality of product sets, the third product set corresponding to a third digital image classification model from the plurality of digital image classification models, the third digital image classification model trained to identify the visual product feature. The series of acts 1300 can also include an act of training the plurality of digital image classification models to classify digital images into product sets based on ground truth product sets and training digital images depicting visual product features. In addition, the series of acts 1300 can include an act of generating the training digital images by, for each of the plurality of digital image classification models: generating a training set of plain digital images depicting a product and adding one or more visual product features to the plain digital images of the training set.

Figure 14:
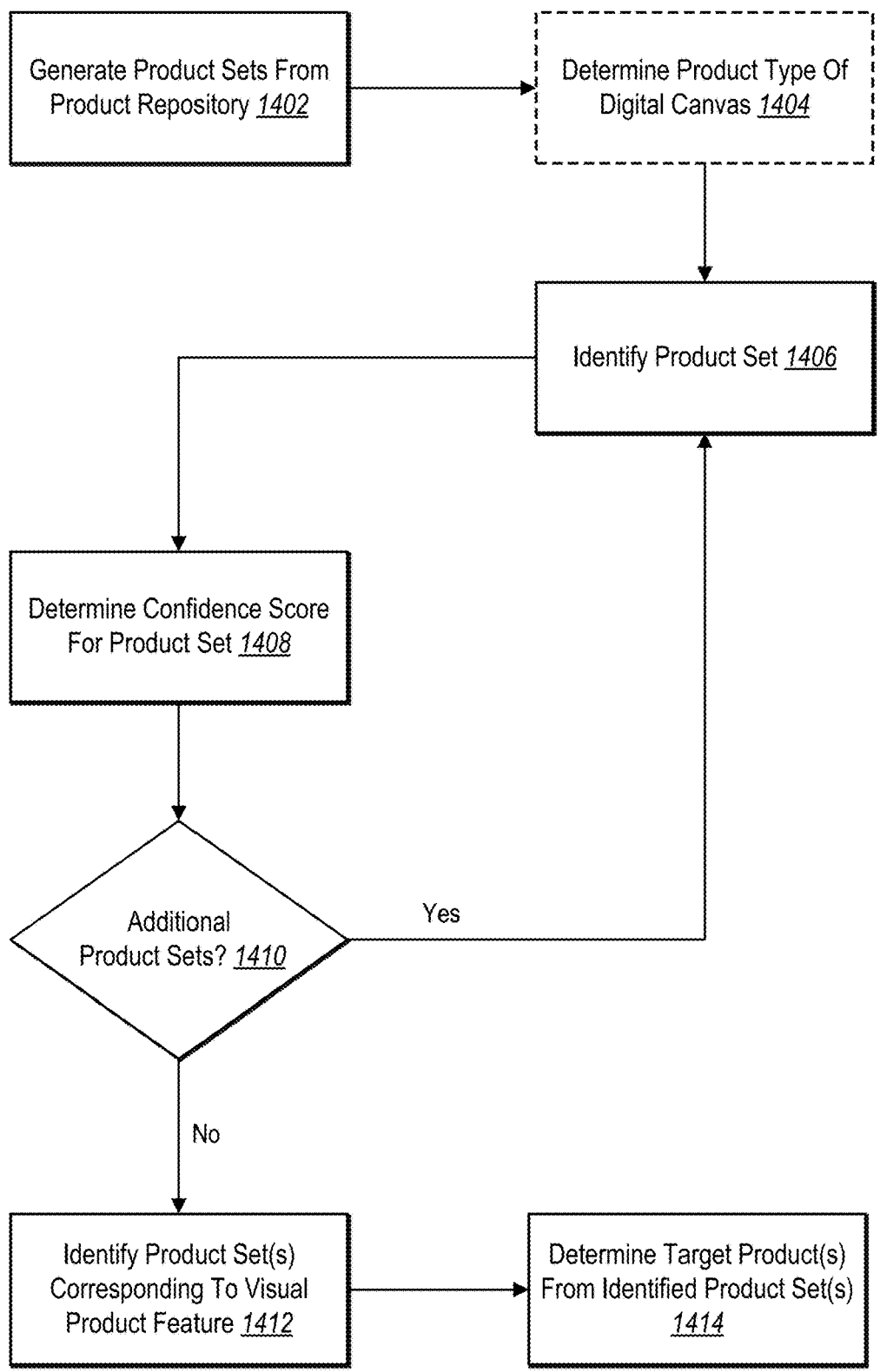
FIG. 14 illustrates a flowchart of a series of acts in a step for utilizing an input-classifier matching model to determine one or more target products that include a visual product feature identified via a digital canvas.

As mentioned, the gesture input search system 102 can perform a step for utilizing an input-classifier matching model to determine one or more target products that include the visual product feature identified via the digital canvas. For example, FIG. 14 illustrates a series of acts 1402-1416 included in a step for utilizing an input-classifier matching model to determine one or more target products that include the visual product feature identified via the digital canvas. In some embodiments, the acts and algorithms described above (e.g., in relation to FIGS. 2, 3, 10) provide corresponding structure for a step for utilizing an input-classifier matching model to determine one or more target products that include the visual product feature identified via the digital canvas As shown, the gesture input search system 102 performs an act 1402 to generate product sets from a product repository. In particular, the gesture input search system 102 utilizes digital image classification models to classify digital images to generate product sets according to visual product features. For example, as described above in relation to FIGS. 2 and 10 the gesture input search system 102 utilizes a trained digital image classification model to generate a separate product set for each visual product feature, in accordance with the disclosure herein.

In addition, in some embodiments (though not necessarily all embodiments) the gesture input search system 102 performs act 1404 to determine a product type associated with a digital canvas. As described, the gesture input search system 102 determines a product type such as a class or label associated with a template applied to the digital canvas (e.g., as selected by a user). Alternatively, the gesture input search system 102 analyzes the digital canvas to determine a product type of a template or a drawing received via gesture input. In other embodiments, the gesture input search system 102 does not need to determine a product type of the digital canvas and instead analyzes the digital canvas to determine a product set.

Indeed, the gesture input search system 102 performs an act 1406 to identify a product set of a plurality of product sets within a product repository. For example, the gesture input search system 102 identifies a product set that corresponds to a template of the digital canvas. Indeed, the gesture input search system 102 identifies a product set to compare with the visual product features of the digital canvas. As described above (e.g., in relation to FIGS. 2, 3), the gesture input search system 102 can identify the product set by comparing the gesture input (and the product type) to a representative figure of product sets determined by digital image classification models.

In addition, the gesture input search system 102 performs an act 1408 to determine a confidence score for the identified product set. For example, the gesture input search system 102 compares the digital canvas (including the gesture input indicating visual product features) with a representative digital image of the product set. The gesture input search system 102 utilizes an input-classifier matching model to generate a confidence score that indicates a probability that the representative digital image includes the visual product feature(s) that are in the digital canvas, as described herein.

As illustrated, the gesture input search system 102 further performs an act 1410 to determine whether there are more product sets within the product repository. For example, in embodiments where the gesture input search system 102 utilizes a product type, the gesture input search system 102 determines whether there are more product sets that match the particular type of the digital canvas. In other embodiments, the gesture input search system 102 determines where there are any product sets of any type within the product repository left to compare with the digital canvas. Based on determining that there are additional product sets, the gesture input search system 102 returns to act 1406 to repeat the process of acts 1406 and 1408 of identify product sets and comparing representative digital images to determine confidence scores.

On the other hand, based on determining that there are no more product sets, the gesture input search system 102 performs an act 1412 to identify one or more product sets corresponding to the visual product feature of the gesture input. For example, the gesture input search system 102 selects a product set with a highest confidence score or selects product sets with confidence scores that satisfy a confidence score threshold. Further, the gesture input search system 102 performs an act 1414 to determine one or more target products from the identified product sets. For example, the gesture input search system 102 identifies the target products from a matching product set (i.e., a product set whose representative digital image includes the indicated visual product feature(s)).

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed at a processor, cause a general-purpose computer, special purpose computer, or special purpose processing device to perform a certain function or group of functions. In some embodiments, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 15:
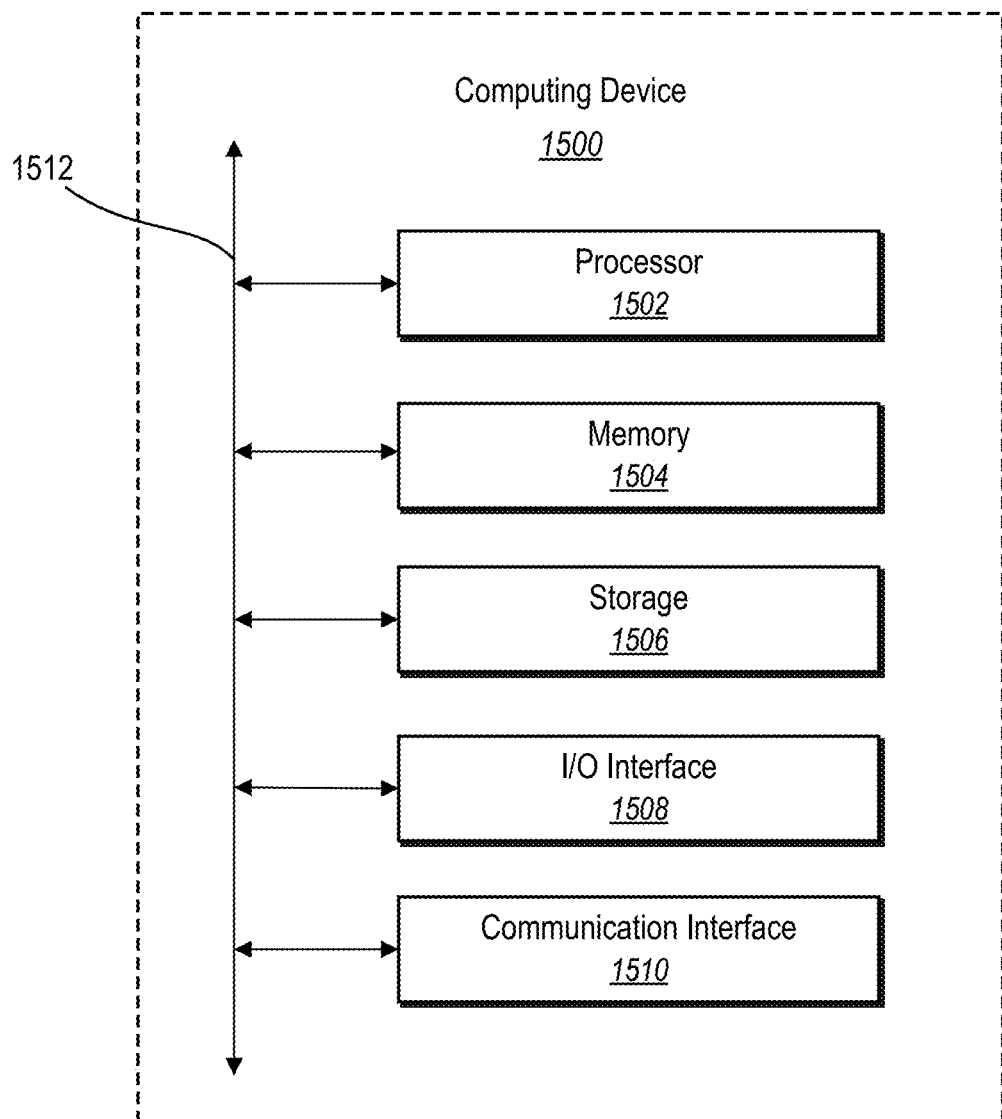
FIG. 15 illustrates a block diagram of an example computing device in accordance with one or more embodiments.

FIG. 15 illustrates, in block diagram form, an example computing device 1500 (e.g., the computing device 1500, the client device 108, and/or the server(s) 104) that may be configured to perform one or more of the processes described above. One will appreciate that the gesture input search system 102 can comprise implementations of the computing device 1500. As shown by FIG. 15, the computing device can comprise a processor 1502, memory 1504, a storage device 1506, an I/O interface 1508, and a communication interface 1510. Furthermore, the computing device 1500 can include an input device such as a touchscreen, mouse, keyboard, etc. In certain embodiments, the computing device 1500 can include fewer or more components than those shown in FIG. 15. Components of computing device 1500 shown in FIG. 15 will now be described in additional detail.

In particular embodiments, processor(s) 1502 includes hardware for executing instructions, such as those making up a computer program. As an example, and not by way of limitation, to execute instructions, processor(s) 1502 may retrieve (or fetch) the instructions from an internal register, an internal cache, memory 1504, or a storage device 1506 and decode and execute them.

The computing device 1500 includes memory 1504, which is coupled to the processor(s) 1502. The memory 1504 may be used for storing data, metadata, and programs for execution by the processor(s). The memory 1504 may include one or more of volatile and non-volatile memories, such as Random-Access Memory ("RAM"), Read Only Memory ("ROM"), a solid-state disk ("SSD"), Flash, Phase Change Memory ("PCM"), or other types of data storage. The memory 1504 may be internal or distributed memory.

The computing device 1500 includes a storage device 1506 includes storage for storing data or instructions. As an example, and not by way of limitation, storage device 1506 can comprise a non-transitory storage medium described above. The storage device 1506 may include a hard disk drive (HDD), flash memory, a Universal Serial Bus (USB) drive or a combination of these or other storage devices.

The computing device 1500 also includes one or more input or output ("I/O") devices/interfaces 1508, which are provided to allow a user to provide input to (such as user strokes), receive output from, and otherwise transfer data to and from the computing device 1500. These I/O devices/interfaces 1508 may include a mouse, keypad or a keyboard, a touch screen, camera, optical scanner, network interface, modem, other known I/O devices or a combination of such I/O devices/interfaces 1508. The touch screen may be activated with a writing device or a finger.

The I/O devices/interfaces 1508 may include one or more devices for presenting output to a user, including, but not limited to, a graphics engine, a display (e.g., a display screen), one or more output drivers (e.g., display drivers), one or more audio speakers, and one or more audio drivers. In certain embodiments, devices/interfaces 1508 is configured to provide graphical data to a display for presentation to a user. The graphical data may be representative of one or more graphical user interfaces and/or any other graphical content as may serve a particular implementation.

The computing device 1500 can further include a communication interface 1510. The communication interface 1510 can include hardware, software, or both. The communication interface 1510 can provide one or more interfaces for communication (such as, for example, packet-based communication) between the computing device and one or more other computing devices 1500 or one or more networks. As an example, and not by way of limitation, communication interface 1510 may include a network interface controller (NIC) or network adapter for communicating with an Ethernet or other wire-based network or a wireless NIC (WNIC) or wireless adapter for communicating with a wireless network, such as a WI-FI. The computing device 1500 can further include a bus 1512. The bus 1512 can comprise hardware, software, or both that couples components of computing device 1500 to each other.

In the foregoing specification, the invention has been described with reference to specific example embodiments thereof. Various embodiments and aspects of the invention(s) are described with reference to details discussed herein, and the accompanying drawings illustrate the various embodiments. The description above and drawings are illustrative of the invention and are not to be construed as limiting the invention. Numerous specific details are described to provide a thorough understanding of various embodiments of the present invention.

The present invention may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel with one another or in parallel with different instances of the same or similar steps/acts. The scope of the invention is, therefore, indicated by the appended claims rather than by the foregoing description. All changes that come within the meaning and range of equivalency of the claims are to be embraced within their scope.

What is claimed is:

1. In a digital medium environment for conducting digital searches for products, a computer-implemented method of identifying products based on free flow inputs, the computer-implemented method comprising:
   utilizing a plurality of digital image classification models to generate a plurality of product sets corresponding to respective visual product features, wherein each of the plurality of digital image classification models is trained to identify a unique visual product feature;
   receiving, via a digital canvas, a particular drawing gesture input from among a plurality of different drawing gesture inputs and modifying a visual product feature depicted on a digital representation of a target product portrayed within the digital canvas;
   determining, via an input-classifier matching model and based on the particular drawing gesture input received via the digital canvas, a first product set from the plurality of product sets corresponding to a first digital image classification model trained to identify the visual product feature as modified by the particular drawing gesture input; and
   providing, for display, digital representations of one or more products from the first product set including the visual product feature as modified by the particular drawing gesture input.

2. The computer-implemented method of claim 1, further comprising providing the digital canvas for display within a product search interface of a website together with digital representations of the one or more products.

3. The computer-implemented method of claim 1, wherein the digital canvas comprises a product template illustrating the target product, wherein the product template is modifiable by drawing gesture inputs.

4. The computer-implemented method of claim 1, wherein the visual product feature comprises one or more of a presence of an object within the target product, a location of an object within the target product, a shape of an object within the target product, a size of an object within the target product, or a rotation of an object within the target product.

5. A non-transitory computer readable medium comprising instructions that, when executed by at least one processor, cause a computer device to:
   utilize a plurality of digital image classification models to generate a plurality of product sets corresponding to respective visual product features, wherein each of the plurality of digital image classification models is trained to identify a unique visual product feature;
   receive, via a digital canvas, a particular drawing gesture input from among a plurality of different drawing gesture inputs and modifying a visual product feature depicted on a digital representation of a target product portrayed within the digital canvas;
   determine, via an input-classifier matching model and based on the particular drawing gesture input received via the digital canvas, a first product set from the plurality of product sets corresponding to a first digital image classification model trained to identify the visual product feature as modified by the particular drawing gesture input; and
   provide, for display, digital representations of one or more products from the first product set including the visual product feature as modified by the particular drawing gesture input.

6. The non-transitory computer readable medium of claim 5, further comprising instructions that, when executed by the at least one processor, cause the computer device to receive the particular drawing gesture input modifying the visual product feature depicted on the digital representation of the target product by detecting a drawing gesture via the digital canvas indicating a location for an object depicted on the digital representation of the target product.

7. The non-transitory computer readable medium of claim 5, further comprising instructions that, when executed by the at least one processor, cause the computer device to determine the first product set by comparing the digital representation of the target product including the visual product feature indicated by the particular drawing gesture input with representative digital images corresponding to the plurality of product sets.

8. The non-transitory computer readable medium of claim 7, wherein comparing the digital representation of the target product with the representative digital images corresponding to the plurality of product sets comprises:
  analyzing the representative digital images of the plurality of product sets to generate confidence scores for the plurality of product sets, the confidence scores indicating probabilities that the plurality of product sets correspond to the visual product feature as modified by the particular drawing gesture input; and
  identifying, from among the representative digital images of the plurality of product sets and based on the confidence scores, a representative digital image of the first digital image classification model that depicts the visual product feature indicated by the particular drawing gesture input.

9. The non-transitory computer readable medium of claim 5, further comprising instructions that, when executed by the at least one processor, cause the computer device to receive, via the digital canvas, a second drawing gesture input further adding an additional visual product feature to the digital representation of the target product portrayed within the digital canvas.

10. The non-transitory computer readable medium of claim 9, further comprising instructions that, when executed by the at least one processor, cause the computer device to determine, via the input-classifier matching model and based on the second drawing gesture input, a second product set from the plurality of product sets corresponding to a second digital image classification model trained to identify the additional visual product feature.

11. The non-transitory computer readable medium of claim 5, further comprising instructions that, when executed by the at least one processor, cause the computer device to:
  receive, via a text input element, a text-based search query; and
  determine, via the input-classifier matching model, a third product set from the plurality of product sets corresponding to the text-based search query and the particular drawing gesture input by:
    determining a product type from the text-based search query; and
    determining a third digital image classification model from the plurality of digital image classification models trained to identify the visual product feature depicted on products of the product type.

12. The non-transitory computer readable medium of claim 5, further comprising instructions that, when executed by the at least one processor, cause the computer device to train the plurality of digital image classification models to classify digital images into product sets based on ground truth product sets and training digital images depicting visual product features.

13. The non-transitory computer readable medium of claim 12, further comprising instructions that, when executed by the at least one processor, cause the computer device to generate the training digital images by, for each of the plurality of digital image classification models:
  generating a training set of plain digital images depicting a product; and
  adding one or more visual product features to the plain digital images of the training set.

14. A system comprising:
  at least one processor; and
  a non-transitory computer readable medium comprising instructions that, when executed by the at least one processor, cause the system to:
    receive, via a digital canvas, a particular drawing gesture input from among a plurality of different drawing gesture inputs and modifying a visual product feature depicted on a digital representation of a target product portrayed within the digital canvas;
    determine, via an input-classifier matching model and based on the particular drawing gesture input received via the digital canvas, a product set corresponding to the visual product feature as modified by the particular drawing gesture input by:
      utilizing the input-classifier matching model to determine, for a plurality of digital image classification models corresponding to a plurality of product sets, confidence scores indicating probabilities that the digital image classification models correspond to the visual product feature as modified by the particular drawing gesture input; and
      selecting, based on the confidence scores for the plurality of digital image classification models, a product set corresponding to a digital image classification model that classifies digital images depicting the visual product feature as modified by the particular drawing gesture input; and
    provide, for display, one or more digital images from the product set that includes products depicting the visual product feature as modified by the particular drawing gesture input.

15. The system of claim 14, further comprising instructions that, when executed by the at least one processor, cause the system to utilize the plurality of digital image classification models to generate the plurality of product sets corresponding to respective visual product features, wherein each of the plurality of digital image classification models is trained to identify a unique visual product feature.

16. The system of claim 14, further comprising instructions that, when executed by the at least one processor, cause the system to determine the product set corresponding to the visual product feature as modified by the particular drawing gesture input by comparing the target product including the visual product feature indicated by the particular drawing gesture input with representative digital images corresponding to the plurality of product sets.

17. The system of claim 16, further comprising instructions that, when executed by the at least one processor, cause the system to utilize the input-classifier matching model to determine the confidence scores by determining, based on comparing the digital representation of the target product including the visual product feature as modified by the particular drawing gesture input with the representative digital images from the plurality of product sets, probabilities that the product sets include digital images that depict product types corresponding to the target product and that include the visual product feature as modified by the particular drawing gesture input.

18. The system of claim 14, further comprising instructions that, when executed by the at least one processor, cause the system to provide the digital canvas for display within a product search interface of a website together with the one or more digital images from the product set that includes products depicting the visual product feature as modified by the particular drawing gesture input.

19. The system of claim 14, wherein the particular drawing gesture input indicating the target product comprises an indication of a location for an object within the digital representation of the target product.

20. The system of claim 19, further comprising instructions that, when executed by the at least one processor, cause the system to determine the confidence scores for the plurality of digital image classification models based on the location for the object within the digital representation of the target product.

* * * * *